US012510106B2

(12) United States Patent
Ohara et al.

(10) Patent No.: US 12,510,106 B2
(45) Date of Patent: Dec. 30, 2025

(54) WORKING MACHINE AND METHOD OF CONTROLLING WORKING MACHINE

(71) Applicant: KUBOTA CORPORATION, Osaka (JP)

(72) Inventors: Shinji Ohara, Sakai (JP); Kohei Horai, Sakai (JP); Yoshihiko Kuroshita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/595,519

(22) Filed: Mar. 5, 2024

(65) Prior Publication Data

US 2024/0301662 A1 Sep. 12, 2024

(30) Foreign Application Priority Data

Mar. 7, 2023 (JP) ................................ 2023-034742

(51) Int. Cl.

*F15B 11/042* (2006.01)
*E02F 9/22* (2006.01)
*F15B 11/044* (2006.01)

(52) U.S. Cl.

CPC .......... *F15B 11/042* (2013.01); *E02F 9/2203* (2013.01); *E02F 9/2221* (2013.01); *F15B 11/044* (2013.01)

(58) Field of Classification Search

CPC ..... E02F 9/2203; E02F 9/2221; F15B 11/042; F15B 11/044

See application file for complete search history.

(56) References Cited

U.S. PATENT DOCUMENTS

| | | | | |
|---|---|---|---|---|
| 5,513,551 | A * | 5/1996 | Morishita ............ | F15B 21/087 91/459 |
| 2020/0157764 | A1 * | 5/2020 | Yamamoto ........... | E02F 9/2012 |
| 2023/0025156 | A1 * | 1/2023 | Cao ....................... | E02F 9/2203 |

FOREIGN PATENT DOCUMENTS

| | | | |
|---|---|---|---|
| JP | 2014-212710 | A | 11/2014 |

* cited by examiner

*Primary Examiner* — Matthew Wiblin

(74) *Attorney, Agent, or Firm* — Keating & Bennett, LLP

(57) ABSTRACT

A working machine includes a driver including a hydraulic actuator to be actuated by a hydraulic fluid, and a controller configured or programmed to change a drive speed of the driver in a drive start period. The controller is configured or programmed to, if a limit value based on which operation of the driver is limited is equal to or more than a threshold, perform a first control in which the controller changes the drive speed of the driver in the drive start period based on the limit value, and if the limit value is less than the threshold, perform a second control in addition to the first control, the second control being a control in which the controller changes a maximum flow rate of the hydraulic fluid to actuate the hydraulic actuator based on the limit value.

3 Claims, 17 Drawing Sheets

WORKING MACHINE AND METHOD OF CONTROLLING WORKING MACHINE

CROSS REFERENCE TO RELATED APPLICATIONS

This application claims the benefit of priority to Japanese Patent Application No. 2023-034742 filed on Mar. 7, 2023. The entire contents of this application are hereby incorporated herein by reference.

BACKGROUND OF THE INVENTION

1. Field of the Invention

The present invention relates to a working machine such as a tractor and a method of controlling a working machine.

2. Description of the Related Art

A lifting device of a working vehicle disclosed in Japanese Unexamined Patent Application Publication No. 2014-212710 raises and lowers a working machine that is coupled to a traveling machine body by causing a hydraulic cylinder to extend and retract and includes the hydraulic cylinder that extends and retracts to raise and lower the working machine, a solenoid valve that controls raising and lowering of the working machine using the hydraulic cylinder, a detector that detects the height of the working machine, and a controller that controls lowering of the working machine by controlling current supply to the solenoid valve. The controller increases the duty ratio or the current value of current that is supplied to the solenoid valve as the difference between the target height and the height of a rotary cultivator increases and reduces the duty ratio or the current value of the current that is supplied to the solenoid valve as the difference from the height of the rotary cultivator decreases.

SUMMARY OF THE INVENTION

With the lifting device of the working vehicle in Japanese Unexamined Patent Application Publication No. 2014-212710, a shock that occurs when the rotary cultivator is raised or lowered is reduced, and a raising/lowering work is smoothly carried out.

In some cases, however, it is difficult, with the control of the lifting device of the working vehicle described in Japanese Unexamined Patent Application Publication No. 2014-212710 alone, to achieve both the reduction in shock that would occur when the rotary cultivator is raised or lowered, and the efficiency of work.

Example embodiments of the present invention provide working machines and methods of controlling working machines each of which reduces a shock when a hydraulic actuator starts being driven and also improves efficiency.

A working machine according to an aspect of an example embodiment of the present invention includes a driver including a hydraulic actuator to be actuated by a hydraulic fluid, and a controller configured or programmed to change a drive speed of the driver in a drive start period, wherein the controller is configured or programmed to, if a limit value based on which operation of the driver is limited is equal to or more than a threshold, perform a first control in which the controller changes the drive speed of the driver in the drive start period based on the limit value, and if the limit value is less than the threshold, perform a second control in addition to the first control, the second control being a control in which the controller changes a maximum flow rate of the hydraulic fluid to actuate the hydraulic actuator based on the limit value.

The controller may be configured or programmed to, in the first control, at least when the limit value is equal to or more than the threshold, change the drive speed of the driver in the drive start period based on the limit value, and when the limit value is less than the threshold, perform the first control in a same manner as in a case where the limit value is equal to the threshold.

The controller may be configured or programmed to, in the first control, increase the drive speed of the driver in the drive start period as the limit value increases, and reduce the drive speed of the driver in the drive start period as the limit value decreases.

The working machine may further include a first manual operator to operate the driver, and a control valve to control the hydraulic actuator. The driver may include a driven structure to be driven by the hydraulic actuator. The first manual operator may be operable to control a target value of a position of the driven structure. The controller may be configured or programmed to control the control valve based on a first graph and a second graph, the first graph representing a relationship between a target flow rate of the hydraulic fluid to actuate the hydraulic actuator and a deviation of an actual position of the driven structure from the target value, the second graph representing a relationship between a current value of control current outputted to a predetermined control valve and a flow rate of the hydraulic fluid from the predetermined control valve.

The controller may be configured or programmed to, in the first control, reduce the current value outputted to the control valve to a greater extent from the current value acquired based on the second graph as the limit value decreases toward the threshold.

The controller may be configured or programmed to, in the first control, correct the second graph or the current value acquired based on the second graph using a correction value based on the limit value, and reduce the current value as the limit value decreases toward the threshold.

The second graph may be defined based on a standard flow rate characteristic graph representing a relationship between the current value outputted to a standard control valve and the flow rate of the hydraulic fluid from the standard control valve, the standard control valve being the predetermined control valve. The correction value, in a case where the limit value is equal to or less than the threshold, may be defined using (i) the current value at a predetermined hydraulic fluid flow rate on a flow rate characteristic graph of a maximum-flow-rate control valve that is higher in the flow rate of the hydraulic fluid than the standard flow rate characteristic graph, and (ii) the current value at the predetermined hydraulic fluid flow rate on the standard flow rate characteristic graph.

The controller may be configured or programmed to, in the first control, count an elapsed time elapsed from when the first manual operator is operated and the driver starts being driven, and limit the target flow rate to a greater extent as the elapsed time decreases.

The controller may be configured or programmed to, in the first control, limit the target flow rate based on a third graph that represents a relationship between the elapsed time and the target flow rate.

The controller may be configured or programmed to, in the first control, acquire the third graph in which the target flow rate against the elapsed time is smaller as the limit value decreases toward the threshold.

The driver may include a lifter to raise and lower a working device. The controller may be configured or programmed to, in the first control, acquire the third graph that differs depending on content of work performed by the working device.

The working machine may further include a machine body, and a protection structure to protect an operator's seat on the machine body. The first manual operator may include an inner manual operator provided inside the protection structure and an outer manual operator provided outside the protection structure. The controller may be configured or programmed to, in the first control, when the inner manual operator is operated, acquire the third graph that differs from when the outer manual operator is operated.

The controller may be configured or programmed to calculate a deviation value of a flow rate characteristic graph of a maximum-flow-rate control valve from a standard flow rate characteristic graph representing a relationship between the current value outputted to a standard control valve and the flow rate of the hydraulic fluid, the standard control valve being the predetermined control valve, the flow rate characteristic graph of the maximum-flow-rate control valve being higher in the flow rate of the hydraulic fluid than the standard flow rate characteristic graph, correct the current value outputted to the control valve using the deviation value, and output the control current having the corrected current value to the control valve.

The working machine may further include a second manual operator to control the limit value. Values of the limit value may be allocated to respective operation amounts of the second manual operator.

The driver may include a lifter to raise and lower a working device, the lifter including a driven structure to be driven by driving the hydraulic actuator. The hydraulic actuator may include a lift cylinder. The driven structure may include a lift arm to be driven by driving the lift cylinder.

The controller may be configured or programmed to, when causing the lift arm to be raised in response to operation of the first manual operator, perform the first control or perform the first control and the second control, and when causing the lift arm to be lowered in response to operation of the first manual operator, not perform the first control or the second control.

The controller may be configured or programmed to, in the second control, increase the maximum flow rate as the limit value increases, and reduce the maximum flow rate as the limit value decreases.

A method of controlling a working machine according to an aspect of an example embodiment of the present invention is a method of controlling a working machine which includes a driver including a hydraulic actuator to be actuated by a hydraulic fluid, and a controller configured or programmed to change a drive speed of the driver in a drive start period, the method including causing the controller to, if a limit value based on which operation of the driver is limited is equal to or more than a threshold, perform a first control in which the controller changes the drive speed of the driver in the drive start period based on the limit value, and causing the controller to, if the limit value is less than the threshold, perform a second control in addition to the first control, the second control being a control in which the controller changes a maximum flow rate of the hydraulic fluid to actuate the hydraulic actuator based on the limit value.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
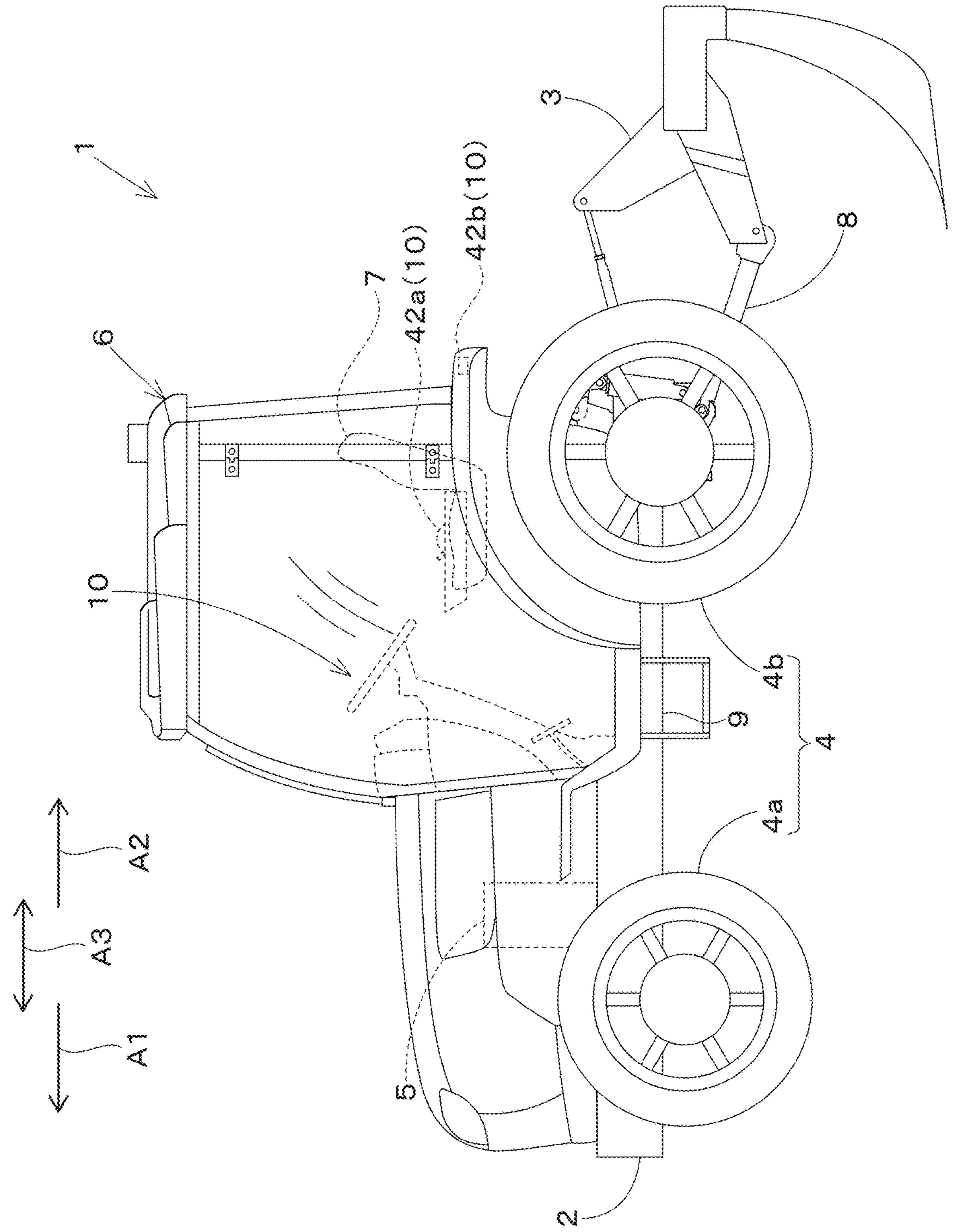
FIG. 1 is a side view of a working machine.

Example embodiments of the present invention will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will hereinafter be described with reference to the drawings.

First Example Embodiment

Figure 2:
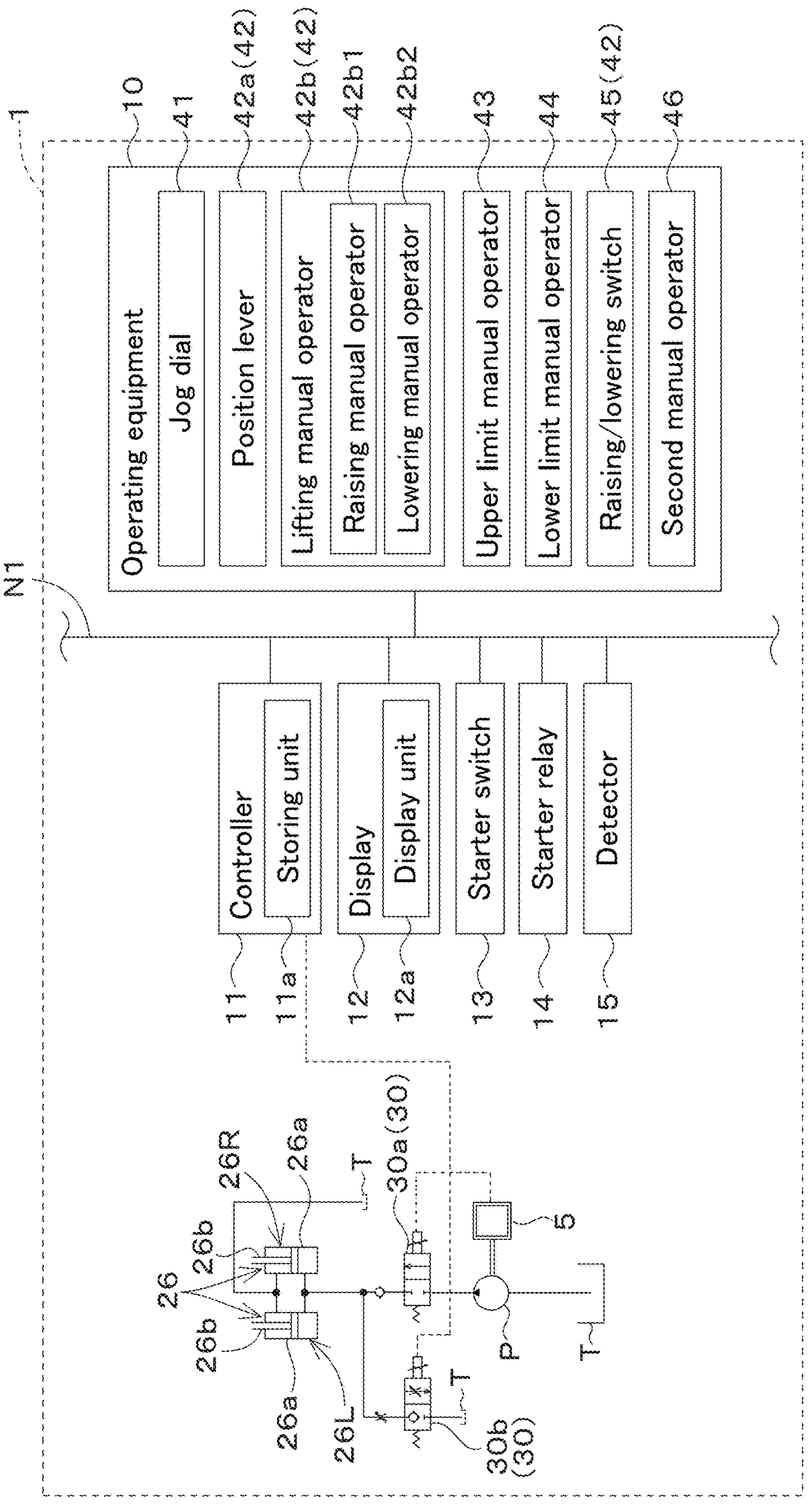
FIG. 2 illustrates a control system of a working machine according to a first example embodiment of the present invention.

A working machine 1 will now be described with reference to FIGS. 1 and 2. FIG. 1 is a side view of the working machine 1 according to the present example embodiment. FIG. 2 illustrates a control system that is included in the working machine 1. As illustrated in FIG. 1, the working machine 1 includes a machine body 2, a working device 3, a traveling device 4, a prime mover 5, a protection structure 6, and a driver 8.

According to one or more example embodiments of the present invention, the direction (the direction of arrow A1 in FIG. 1) in which a driver who sits on an operator's seat 7 of the working machine 1 faces is referred to as a forward direction, and the direction (the direction of arrow A2 in FIG. 1) opposite to the forward direction is referred to as a rearward direction. The rightward direction (the direction of arrow B2 in FIG. 3) from the driver is referred to as a rightward direction, and the leftward direction (the direction of arrow B1 in FIG. 3) from the driver is referred to as a leftward direction. A horizontal direction (the direction of arrow B3 in FIG. 3) perpendicular to the front-rear direction (the direction of arrow A3 in FIG. 1) of the working machine 1 is referred to as a vehicle body width direction (or a width direction).

The working device 3 is, for example, an implement, is coupled to a rear portion of the machine body 2, and can carry out various kinds of work. The type of working device 3 is not particularly limited, and examples thereof include a digger that digs potatoes or carrots, spreaders such as a fertilizer spreader (fertilizer applicator) that spreads fertilizer and an agricultural chemical spreader that spreads agricultural chemicals, a seeder that sows seeds in an agricultural field, a harvester for harvest, a mower for mowing, for example, grass, a tedder for tedding, for example, grass, a rake for raking, for example, grass, a baler for baling, for example, grass, and a ground implement to perform work on an agricultural field.

Examples of the ground implement include a stubble cultivator for stubble cultivation, a drive harrow for puddling, and a cultivator (rotary cultivator, subsoiler, plow, or cultivator) for cultivation work. A cultivator (such as a subsoiler, a plow, or a cultivator) (working device 3) that carries out work on the ground by being towed by the working machine 1 is referred to as a towed cultivator. FIG. 1 illustrates an example in which a plow as the working device 3 is coupled to the rear portion of the machine body 2.

The traveling device 4 applies a propelling force to the machine body 2. In the example illustrated in FIG. 1, the traveling device 4 is a wheeled device that includes at least one front wheel 4*a* and at least one rear wheel 4*b* but may be a crawler device.

The driver (lifter) 8 can couple the working device 3 to the machine body 2 and can raise and lower the working device 3 with respect to the machine body 2. The lifter 8 is provided at the rear portion of the machine body 2. For example, the lifter 8 includes a three-point linkage and/or the like. The working device 3 is attachable to and detachable from the lifter 8. The working device 3 is coupled to the lifter 8, and therefore the machine body 2 can move the working device 3.

Examples of the prime mover 5 include a diesel engine and an electric motor. In the present example embodiment, the prime mover 5 includes a diesel engine. A flywheel housing is provided at a rear portion of the prime mover 5. Power that is outputted by the prime mover 5 is transmitted to a transmission case 9 located at a lower portion of the machine body 2.

As illustrated in FIG. 1, the working machine 1 includes operating equipment 10 and the operator's seat 7 that is provided at an upper portion of the machine body 2. The operator's seat 7 is provided inside the protection structure (such as a cabin or a canopy) 6. The operating equipment 10 is provided in the vicinity of, for example, the operator's seat 7, and includes a collection of device(s), member(s), and so on related to operations, performed by a operator who sits on the operator's seat 7, of machine(s), device(s), equipment, and member(s) (such as the working device 3, the traveling device 4, and the prime mover 5) included in the working machine 1. The operating equipment 10 includes a steering that at least includes, for example, a steering wheel.

As illustrated in FIG. 2, devices included in the working machine 1 are connected together via an in-vehicle network N1 such as CAN, ISOBUS, LIN, or FlexRay. Examples of the devices connected to the in-vehicle network N1 include the prime mover 5, the operating equipment 10, a controller 11, a display 12, a starter switch 13, and a starter relay 14.

The display 12 includes a display unit 12*a* such as a liquid crystal display and displays various information about the working machine 1 on the display unit 12*a*. The display 12 is provided at a location in the vicinity of the operator's seat 7 (such as a position forward of the operator's seat 7 or rearward of the operator's seat 7). In the present example embodiment, the display 12 is a monitor (dashboard monitor) provided in a meter panel located forward of the operator's seat 7.

The display 12 is operated by a jog dial 41 included in the operating equipment 10. The jog dial 41 is operated by being rotated. The operator performs rotates the jog dial 41 to cause the display 12 to change the candidate to be selected from options displayed on the display unit 12*a*. The jog dial 41 can be operated by being pressed in addition to being rotated, and the selection of an option is confirmed by pressing the jog dial 41.

The controller 11 may include ECU(s) (electronic controller(s)) and may include CPU(s), volatile memory(memories), nonvolatile memory(memories), other electronic component(s), electric circuit(s), and/or the like. The nonvolatile memory of the controller 11 stores software program(s) and various data for the CPU(s) to control components. That is, the controller 11 is configured or programmed to control the working machine 1.

The controller 11 performs various kinds of control relating to the working machine 1. For example, the controller 11 operates the working device 3, the traveling device 4, the prime mover 5, and so on, based on signals (operation signals) inputted from the operating equipment 10. As illustrated in FIG. 2, the controller 11 includes a storing unit (storage and/or memory) 11*a*. The storing unit 11*a* is a storing device that stores various information, such as a nonvolatile memory. For example, the storing unit 11*a* stores various kinds of application software. The storing unit 11*a* may be a storing device such as a hard disk drive (HDD) or a solid-state drive (SSD) that is provided outside the controller 11 and that is connected to the in-vehicle network N1.

The starter switch 13 starts the prime mover 5. The operator inserts an engine key into a key cylinder in the vicinity of the operator's seat and rotates the engine key, so that the starter switch 13 outputs a signal (start signal) to start the prime mover to the starter relay 14.

The starter relay 14 is a component to start the prime mover 5. Upon receipt of the start signal, the starter relay 14 starts the prime mover 5. Note that starting the prime mover, which is a kind of driving of the prime mover, is not limited to a mechanical method (key cylinder method) by which the engine key is inserted into the key cylinder, to turn on the starter relay 14, but may be a smart entry method by which the start of the prime mover is permitted or prohibited via wireless communication.

Figure 3:
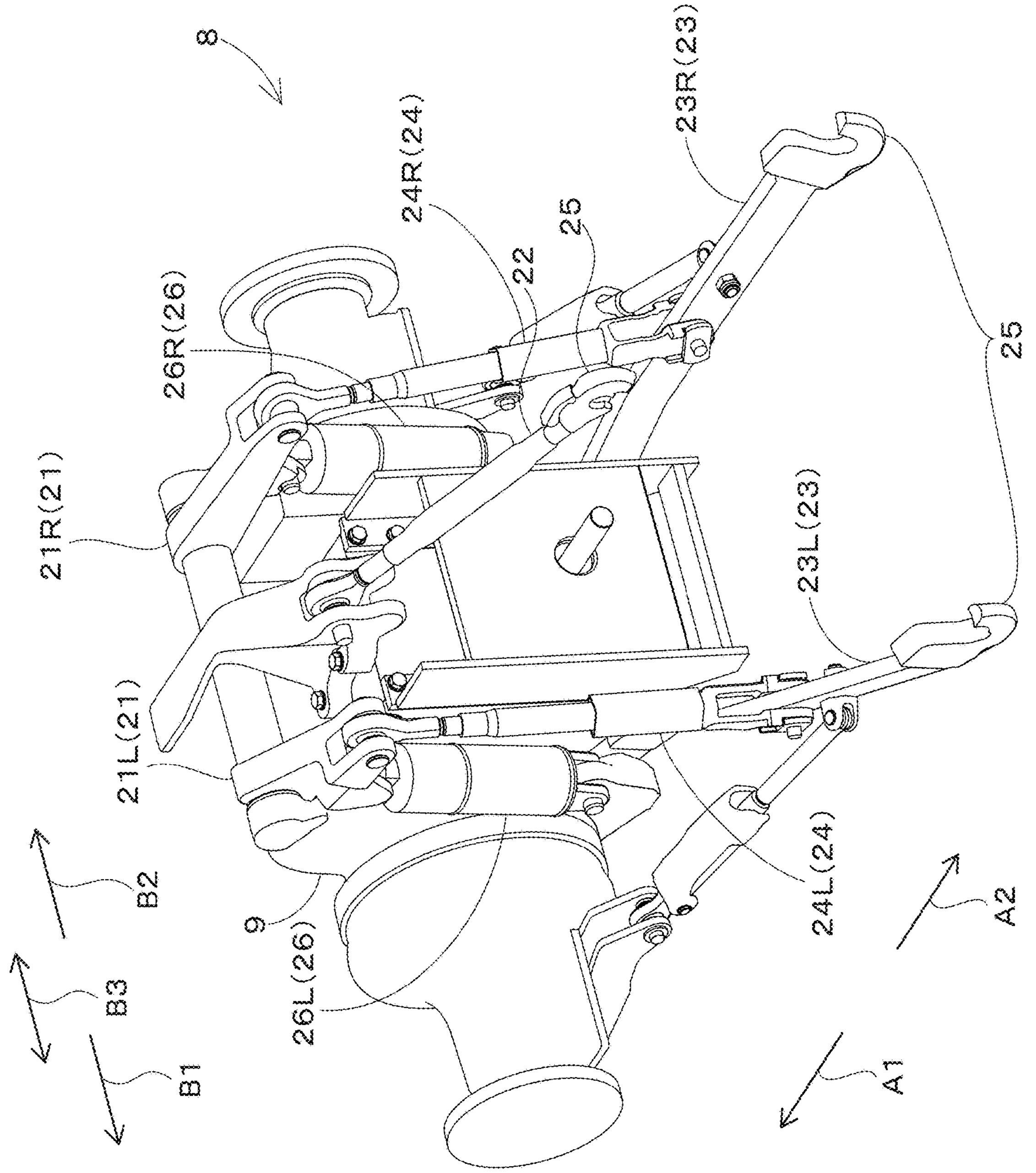
FIG. 3 is a rear-left perspective view of a lifter.
Figure 4:
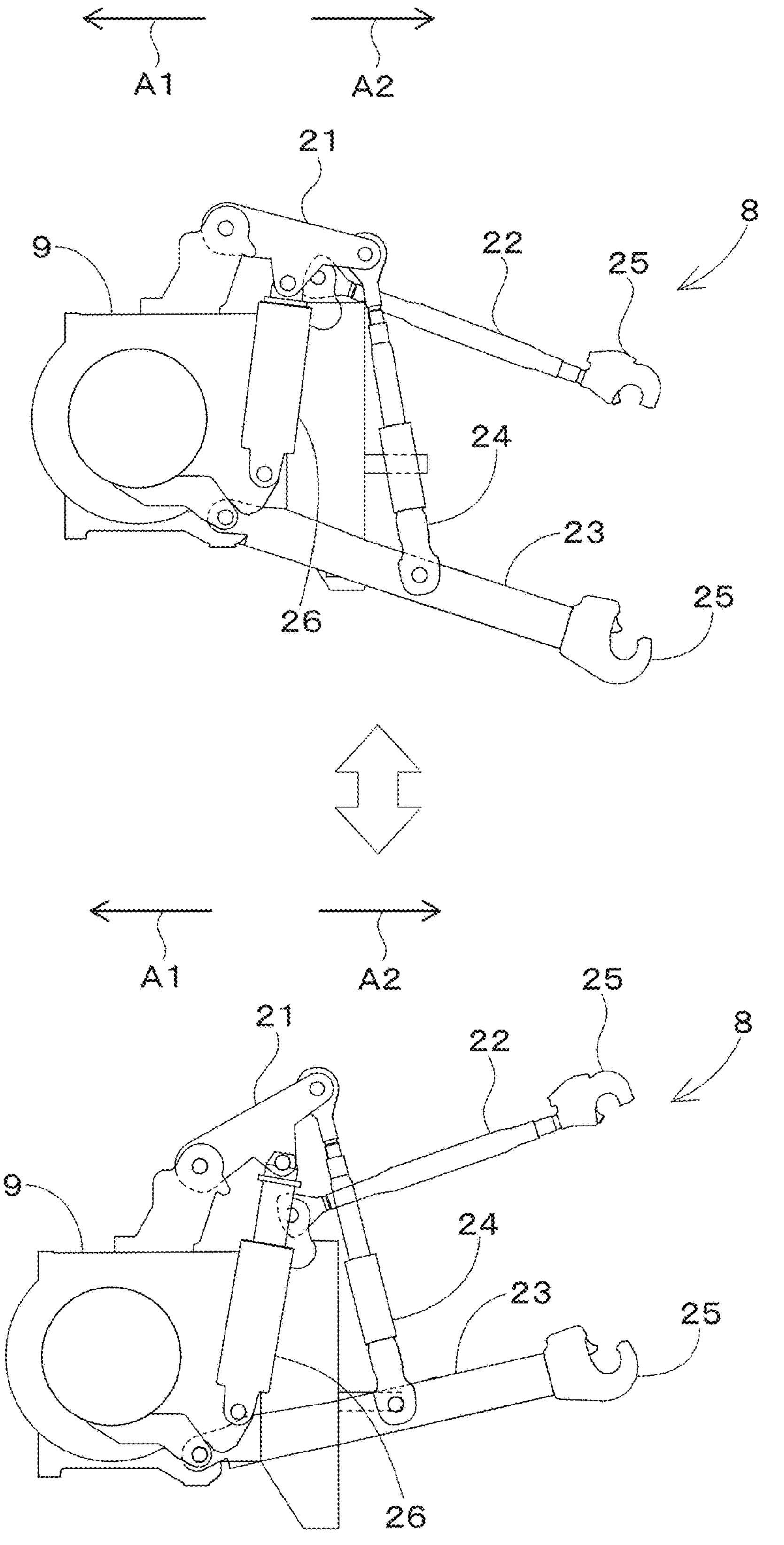
FIG. 4 is a left side view illustrating raising/lowering operation of a lifter.

The lifter 8 will now be described in detail. As illustrated in FIGS. 3 and 4, the lifter 8 is connected to the transmission case 9. FIG. 3 is a rear left perspective view of the lifter 8. FIG. 4 is a left side view illustrating raising/lowering operation of the lifter 8. As illustrated in FIGS. 3 and 4, the lifter 8 includes lift arm(s) (driven structure(s)) 21, a top link 22, lower link(s) 23, lift rod(s) 24, and lift cylinder(s) (hydraulic actuator(s)) 26.

As illustrated in FIG. 3, the lift arm(s) 21 includes a first lift arm 21L and a second lift arm 21R. The first lift arm 21L is provided on of opposite sides in the machine body width direction (on the left side). The second lift arm 21R is provided on the other of the opposite sides in the machine body width direction (on the right side). The first lift arm 21L and the second lift arm 21R are provided swingably on the machine body 2. Specifically, the first lift arm 21L and the second lift arm 21R have front end portions pivotably supported on an upper portion of the transmission case 9 and extend in the rearward direction.

The top link 22 is provided between the first lift arm 21L and the second lift arm 21R, and a front end portion is pivotally supported on the upper portion of the transmission case 9. The lower link(s) 23 includes a first lower link 23L and a second lower link 23R. Front end portions of the first lower link 23L and the second lower link 23R are pivotally supported on a lower portion of the transmission case 9. The lift rod(s) 24 includes a first lift rod 24L and a second lift rod 24R. The first lift rod 24L has an upper end portion connected to a rear end portion of the first lift arm 21L and a lower end portion connected to an intermediate portion of the first lower link 23L in the length direction. The second lift rod 24R has an upper end portion connected to a rear end portion of the second lift arm 21R and a lower end portion connected to an intermediate portion of the second lower link 23R in the length direction.

As illustrated in FIGS. 3 and 4, joints 25 configured to attach the working device 3 are provided at a rear end portion of the top link 22 and rear end portions of the lower link 23. The working device 3 is linked to the rear end portion of the top link 22 and the rear end portions of the lower link 23, so that the working device 3 is coupled to a rear portion of the working machine 1 such that the working device 3 can be raised and lowered. Thus, the working device 3 is coupled to the lift arm 21 via the lift rod 24 and the lower links 23.

As illustrated in FIGS. 3 and 4, each lift cylinder 26 is a hydraulic actuator (hydraulic cylinder) to be actuated by a hydraulic fluid. As illustrated in FIG. 2, the lift cylinder 26 is a single-acting cylinder and includes a tubular cylinder tube 26*a* and a piston rod 26*b* having an end portion thereof slidably inserted in the cylinder tube 26*a*. The inner space of the cylinder tube 26*a* is divided into a bottom fluid chamber and a rod fluid chamber by a piston movable in a direction of the axis of the cylinder tube 26*a* (axial direction). Thus, when hydraulic fluid is supplied to the bottom fluid chamber, the lift cylinder 26 extends. When hydraulic fluid is discharged from the bottom fluid chamber, the lift cylinder 26 retracts.

The lift cylinders 26 include a first lift cylinder 26L and a second lift cylinder 26R. The first lift cylinder 26L has an end portion connected to the first lift arm 21L and another end portion connected to a lower left portion of the transmission case 9. The second lift cylinder 26R had an end portion connected to the second lift arm 21R and another end portion connected to a lower right portion of the transmission case 9. When the lift cylinders 26 are driven, the first lift arm 21L and the second lift arm 21R swing in an up-and-down direction.

Note that the driver 8 is not limited to the lifter, provided that the driver 8 includes the hydraulic actuator 26 to be actuated by a hydraulic fluid and the driven structure 21 driven by the hydraulic actuator 26 being driven.

As illustrated in FIG. 2, the working machine 1 includes a hydraulic pump P and control valve(s) 30. The hydraulic pump P is actuated by power produced by the prime mover. The hydraulic pump P delivers hydraulic fluid stored in a hydraulic fluid tank T. The hydraulic pump P includes a fixed displacement gear pump or a variable displacement hydraulic pump that includes a pump displacement control mechanism such as a swash plate.

The control valve(s) 30 controls the hydraulic actuator(s) (lift cylinder(s)) 26. Each control valve 30 is energized by control current outputted from the controller 11 to change the opening. With this, the control valve 30 is capable of adjusting hydraulic fluid to actuate the lift cylinder 26. An example of the control valve 30 is a proportional flow control solenoid valve. The flow rate of the hydraulic fluid supplied to the hydraulic actuator 26 increases as the current value I of the control current outputted from the controller 11 increases.

In the present example embodiment, the control valve(s) 30 includes a first control valve (raising control valve) 30*a* to control the extension of the lift cylinder 26 and a second control valve (lowering control valve) 30*b* to control the retraction of the lift cylinder 26. The first control valve 30*a* and the second control valve 30*b* are connected to both the first lift arm 21L and the second lift arm 21R and cause the first lift arm 21L and the second lift arm 21R to extend or retract at the same time.

The first control valve 30*a* is provided in a fluid passage that connects the hydraulic pump P and the bottom fluid chamber to each other. The first control valve 30*a* is capable of supplying hydraulic fluid delivered by the hydraulic pump P to the bottom fluid chamber by changing the opening.

The second control valve 30*b* is provided in a fluid passage that connects the bottom fluid chamber and the hydraulic fluid tank T to each other. The second control valve 30*b* is capable of allowing hydraulic fluid from the bottom fluid chamber to be drained to the hydraulic fluid tank T by changing the opening.

Accordingly, when the controller 11 outputs control current to the first control valve 30*a* and the opening of the first control valve 30*a* is changed, the hydraulic fluid delivered by the hydraulic pump P is supplied to the bottom fluid chamber and the lift cylinder 26 extends, so that the lift arm 21 is raised. On the contrary, when the controller 11 outputs control current to the second control valve 30*b* and the opening of the second control valve 30*b* is changed, the hydraulic fluid in the bottom fluid chamber is drained to the hydraulic fluid tank T and the lift cylinder 26 is allowed to retract. Thus, the lift cylinder 26 retracts due to the weight of the working device 3 and/or the lift arm 21, so that the lift arm 21 is lowered.

Note that, with regard to the control valve 30, the hydraulic system thereof is not limited to the structure described above, provided that the lift cylinder (hydraulic actuator) 26 can be controlled. For example, the first control valve 30*a* and the second control valve 30*b* are connected to the bottom fluid chambers in the above example. However, the second control valve 30*b* may be provided in a fluid passage that connects the hydraulic pump P and the rod fluid chamber to each other so that the hydraulic fluid delivered by the hydraulic pump P is supplied to the rod fluid chamber by changing the opening.

In the example embodiment described above, the openings of the first control valve 30*a* and the second control valve 30*b* are changed, so that the lift cylinder 26 is controlled. However, the control valve(s) 30 may be a three-way solenoid switching valve that can switch between a first position in which the lift cylinder 26 extends, a second position in which the lift cylinder 26 stops being driven, and a third position in which the lift cylinder 26 retracts.

In the example embodiment described above, the first control valve 30*a* and the second control valve 30*b* directly adjust the hydraulic fluid to actuate the lift cylinder 26. However, the first control valve 30*a* and the second control valve 30*b* may cause pilot fluid to act on a control valve connected to the lift cylinder(s) 26, and the control valve may adjust the hydraulic fluid to actuate the lift cylinder(s) 26. The structure of the hydraulic system is not limited to the structure described above.

The operating equipment 10 includes a first manual operator 42 to operate the driver (lifter) 8 (to raise or lower the working device 3). The first manual operator 42 is a portion of the operating equipment 10 to control the target value of the position of the lift arm(s) 21. The controller 11 controls the control valve(s) 30 in response to the operation of the first manual operator 42 such that the deviation ΔD between the actual position of the lift arm 21 and the target value is zero.

As illustrated in FIG. 2, the working machine 1 includes a detector 15 to detect the actual position of the lift arm(s) 21. The detector 15 is a sensor to calculate the position of the lift cylinder(s) 26. The detector 15 is connected to the controller 11 and outputs a detected signal (detection signal) to the controller 11.

In the present example embodiment, the detector 15 is a sensor (lift arm sensor) to detect the angle of the lift arm(s) 21, and the controller 11 controls the control valve(s) 30 based on the angle of the lift arm(s) 21 as the position of the lift arm(s) 21. That is, the controller 11 controls the control valve(s) 30 to actuate the lift cylinder(s) 26 such that the deviation ΔD between the actual position (actual angle of the lift arm(s) 21) and the target value (target angle of the lift arm(s) 21) is zero. An example of the lift arm sensor 15 is a rotational displacement variable resistor such as a potentiometer. The lift arm sensor 15 outputs a signal (angle signal) of the detected angle to the controller 11.

The lift arm sensor 15 is not limited, provided that the angle of the lift arm(s) 21 can be detected. For example, the detector 15 may be a lift cylinder sensor to detect the extension (stroke) of the lift cylinder(s) 26, provided that parameter(s) to detect the actual position of the lift arm(s) 21 can be detected. In such a case, the controller 11 controls the control valve(s) 30 based on the degree of extension of the lift cylinder(s) 26 as the position of the lift arm(s) 21. That is, the controller 11 controls the control valve(s) 30 to actuate the lift cylinder(s) 26 such that the deviation ΔD between the actual position (the degree of the actual extension of the lift cylinder 26) and the target value (the degree of the target extension of the lift cylinder 26) is zero.

The controller 11 may control the control valve(s) 30 based on the height of predetermined portion(s) (e.g., rear end portion(s)) of the lift arm(s) 21 in the vertical direction as the position of the lift arm(s) 21. In such a case, the controller 11 calculates the height of the rear end portion(s) of the lift arm(s) 21 in the vertical direction based on the parameter(s) (the actual angle of the lift arm(s) 21 and/or the degree of the actual extension of the lift cylinder(s) 26) detected by the detector 15 and on a predetermined arithmetic expression. The controller 11 controls the control valve(s) 30 to actuate the lift cylinder(s) 26 such that the deviation ΔD between the actual position (such as the height of the rear end portion(s) of the lift arm(s) 21) and the target value (such as the target height of the rear end portion(s) of the lift arm(s) 21) is zero.

In an example described below, the first manual operator 42 controls the angle of the lift arm(s) 21 as the target value, and the controller 11 controls the control valve(s) 30 such that the deviation ΔD between the actual position (the actual angle of the lift arm(s) 21) and the target value (the target angle of the lift arm(s) 21) is zero.

An example of the first manual operator 42 is a position lever 42*a*. The position lever 42*a* is used to raise and lower the working device 3 and is operated by being swung. The position lever 42*a* is provided with a potentiometer to detect the amount of operation of the position lever 42*a*. The controller 11 can define the target value (target angle) of the lift arm(s) 21 based on an operation signal outputted from the potentiometer. As the amount of operation of the position lever 42*a* increases, the target value defined by the controller 11 increases according to the amount of operation. As the amount of operation of the position lever 42*a* decreases, the target value defined by the controller 11 decreases according to the amount of operation.

The first manual operator 42 is not limited to the position lever 42*a* but may include a lifting manual operator 42*b* that differs from the position lever 42*a* and that is used to raise and lower the working device 3. Examples of the lifting manual operator 42*b* include a push button switch such as a tactile switch and a seesaw switch. The lifting manual operator 42*b* is connected to the controller 11 and outputs an operation signal to the controller 11. The controller 11 defines the target value according to the amount of operation of the lifting manual operator 42*b* (such as the time for which the lifting manual operator 42*b* is operated or the number of times the lifting manual operator 42*b* is operated). In the present example embodiment, the lifting manual operator 42*b* includes a raising manual operator 42*b*1 to increase the target value of the lift arm(s) 21 and a lowering manual operator 42*b*2 to reduce the target value of the lift arm(s) 21. That is, if the raising manual operator 42*b*1 is operated, the controller 11 defines a larger target value according to the operation. If the lowering manual operator 42*b*2 is operated, the controller 11 defines a smaller target value according to the operation.

As illustrated in FIG. 1, the position lever 42*a* is provided inside the protection structure 6, and the lifting manual operator 42*b* is provided outside (for example, laterally from the lifter 8, or a rear fender) the protection structure 6. In the following description, the first manual operator 42 provided inside the protection structure 6 like the position lever 42*a* may be referred to as an “inner manual operator”, and the first manual operator 42 provided outside the protection structure 6 like the lifting manual operator 42*b* may be referred to as an “outer manual operator”.

In the example described above, the controller 11 defines a target value according to the amount of operation of the first manual operator 42. However, the working machine 1 may include an upper limit manual operator 43 to control the upper limit value of the position of the lift arm(s) 21 and a lower limit manual operator 44 to control the lower limit value of the position of the lift arm 21, and the first manual operator 42 may include a raising/lowering switch 45 to raise and lower the lift arm(s) 21 up to the upper limit value or the lower limit value of the position of the lift arm(s) 21.

In the case where the working machine 1 includes the upper limit manual operator 43 and the lower limit manual operator 44, the controller 11 actuates the lift arm(s) 21 within the range from the upper limit value to the lower limit value of the position of the lift arm(s) 21, inclusive, also when controlling the control valve(s) 30 according to the operation of the position lever 42*a* and/or the lifting manual operator 42*b* as the first manual operator 42.

The controller 11 outputs control current to the control valve 30 (which may be hereinafter the control valve 30 or the control valves 30) based on an operation signal outputted from the first manual operator 42, to control the control valve 30. For example, the controller 11 determines each current value I of the control current to the control valve 30 based on the operation signal, a first graph M1, and a second graph M2. The first graph M1 and the second graph M2 are stored in the storing unit 11*a* in advance.

In the case where the lift arm 21 (which may be hereinafter the lift arm 21 or the lift arms 21) is raised, the target value is higher than the actual position, and therefore the deviation ΔD is positive. In the case where the lift cylinder 26 (which may be hereinafter the lift cylinder 26 or the lift cylinders 26) is lowered, the target value is lower than the actual position, and therefore the deviation ΔD is negative. In the following description, however, the absolute value of the difference between the target value and the actual position is used as the deviation ΔD for convenience of description.

The first graph M1 and the second graph M2 may be the same or may differ from each other between the case where the lift arm 21 is raised and the case where the lift arm 21 is lowered.

Figure 5:
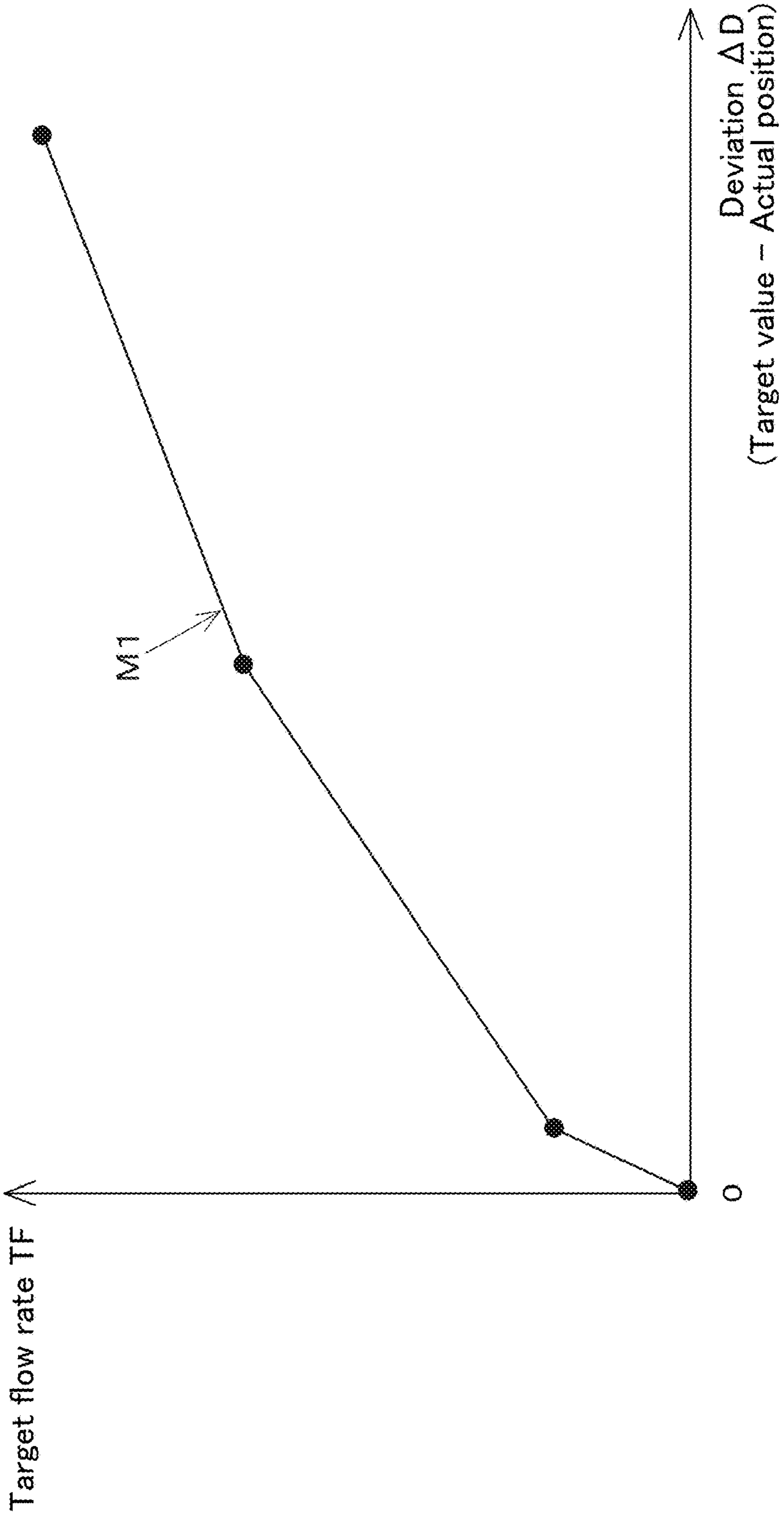
FIG. 5 illustrates an example of a first graph.

FIG. 5 illustrates an example of the first graph M1. The first graph M1 is a graph (a chart) that represents the relationship between the target flow rate TF of the hydraulic fluid to actuate the hydraulic actuator 26 and the deviation ΔD between the actual position and the target value. In the chart illustrated in FIG. 5, the horizontal axis represents the deviation ΔD between the actual position and the target value, and the vertical axis represents the target flow rate TF of the hydraulic fluid to actuate the hydraulic actuator 26. On the example of the first graph M1 illustrated in FIG. 5, the target flow rate TF changes such that, as the deviation ΔD of the actual position from the target value increases, the target flow rate TF increases sharply and then increases gradually.

The first graph M1 illustrated in FIG. 5 is merely an example. The target flow rate TF may change such that the target flow rate TF increases gradually and then increases sharply or proportionally increases in a substantially straight line as the deviation ΔD of the actual position from the target value increases.

Figure 6:
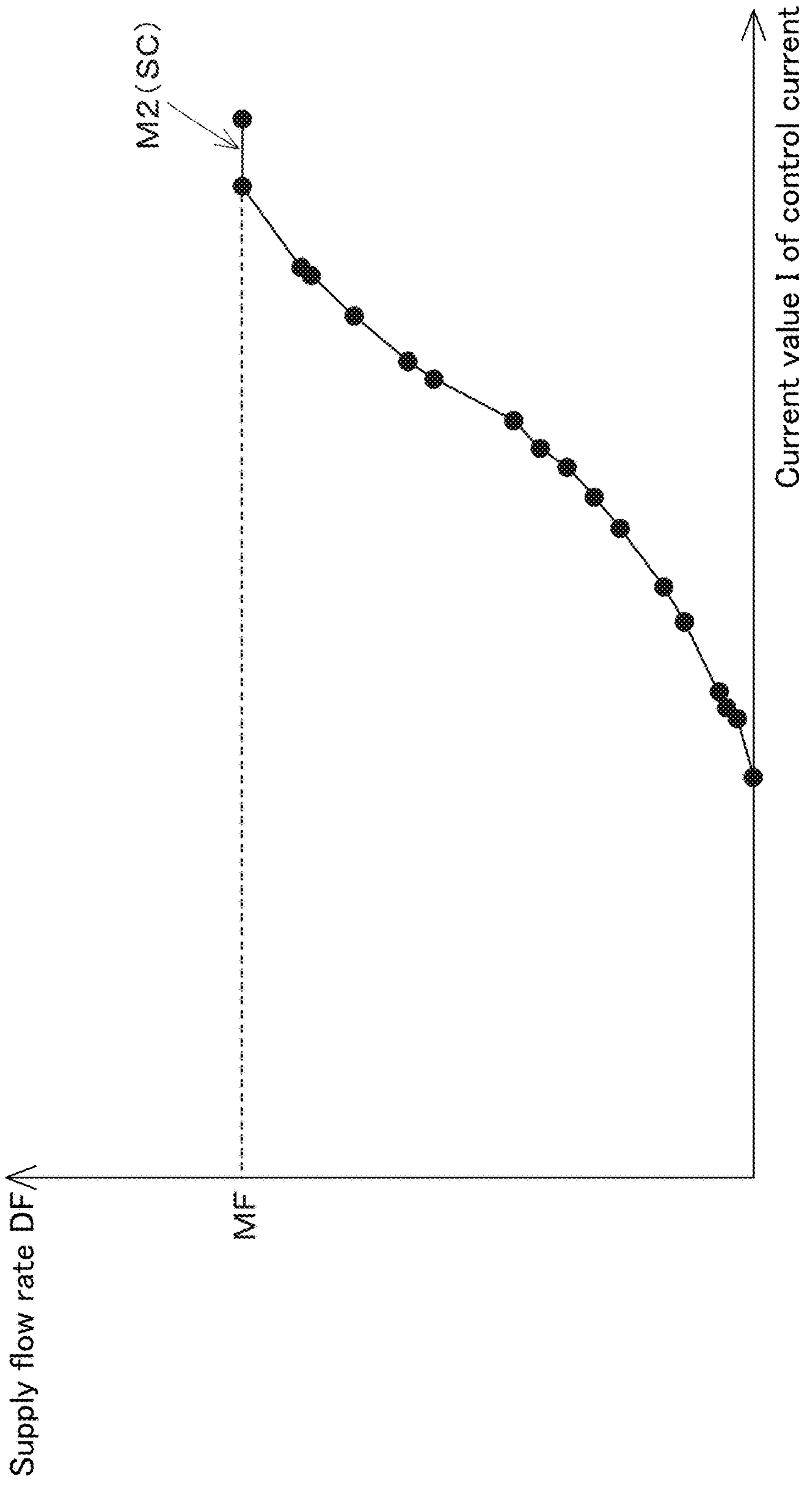
FIG. 6 illustrates an example of a second graph.

FIG. 6 illustrates an example of the second graph M2. The second graph M2 is a graph (a chart) that represents the relationship between the current value I of the control current outputted to predetermined control valve(s) 30 (such as a standard control valve) and the flow rate (supply flow rate DF) of the hydraulic fluid from the predetermined control valve 30. The standard control valve is a control valve 30 that is a central-flow-rate control valve. That is, the second graph M2 is defined based on flow rate characteristics SC of the standard control valve of design data or theoretical data. The standard flow rate characteristics SC are flow rate characteristics of the standard control valve, and are, for example, flow rate characteristics of design data or theoretical data. For this reason, the standard flow rate characteristics SC are design or theoretical flow rate characteristics of the standard control valve.

The standard flow rate characteristics SC may be obtained by performing arithmetic processing such as averaging or standardization of measured data of flow rate characteristics regarding a plurality of control valves 30. That is, the standard flow rate characteristics SC may be based on a plurality of pieces of measured data. The standard flow rate characteristics SC may be those indicated by standard product specification data of a control valve 30 provided by, for example, a manufacturer.

In the chart illustrated in FIG. 6, the horizontal axis represents the value I of control current (hereinafter may be referred to as "current value I"), and the vertical axis represents supply flow rate DF. In the example of the second graph M2 illustrated in FIG. 6, as the current value I of the control current increases, the supply flow rate DF changes such that the supply flow rate DF increases gradually and then increases sharply.

The second graph M2 in FIG. 6 is merely an example. The second graph M2 need only be defined based on flow rate characteristics of design data or theoretical data of a predetermined control valve 30.

Therefore, the controller 11 first calculates the deviation ΔD of the actual position from the target value and then acquires the first graph M1 and the second graph M2 depending on the direction of operation (raising or lowering) of the lift arm 21. The controller 11 acquires the target flow rate TF based on the deviation ΔD and the first graph M1. The controller 11, after acquiring the target flow rate TF, acquires the current value I of the control current based on the target flow rate TF and the second graph M2. With this, the controller 11 outputs the acquired current value I to the control valve(s) 30 to control the control valve(s) 30.

It is noted here that the controller 11 gradually reduces the current value I as the deviation ΔD gradually decreases. The current value I of the control current to the control valve 30 is set to zero by the controller 11 when the deviation ΔD is zero. The controller 11 thus controls the control valve 30 based on the operation of the first manual operator 42 to drive the lift cylinder 26.

As illustrated in FIG. 2, the working machine 1 includes a second manual operator 46, and the controller 11 controls the control valve(s) 30 depending on the operation of the second manual operator 46 in addition to the operation of the first manual operator 42. The second manual operator 46 is a portion of the operating equipment 10 to control a limit value V based on which the operation of the driver (lifter) 8 is limited. In the present example embodiment, the limit value V is a value based on which the operation of the driver 8 using the first manual operator 42 is limited. The second manual operator 46 is operated by being rotated, and values of the limit value V are allocated to respective operation amounts. Values from 0% to 100% are allocated as the limit value V to the second manual operator 46. The controller 11 acquires an operation signal from the second manual operator 46 and acquires a limit value V based on the operation signal. Specifically, the controller 11 acquires the limit value V based on the acquired operation signal and on a predetermined arithmetic expression or an operation graph that is stored in the storing unit 11*a* and that represents the relationship between the operation signal and the limit value V.

The controller 11 limits the operation of the lifter 8 using the first manual operator 42 to a greater extent as the limit value V decreases, and limits the operation of the lifter 8 using the first manual operator 42 to a lesser extent as the limit value V increases. That is, the controller 11 limits the operation of the lifter 8 using the first manual operator 42 to the maximum extent in the case where the limit value V is 0% and does not limit the operation of the lifter 8 using the first manual operator 42 in the case where the limit value V is 100%.

The definition of the limit value V is merely an example. The controller 11 may be configured or programmed to not limit the operation of the lifter 8 using the first manual operator 42 in the case where the limit value V is 0% and limit the operation of the lifter 8 using the first manual operator 42 to the maximum extent in the case where the limit value V is 100%. The relationship between the magnitude of the limit value V and the degree of the limitation on the operation of the lifter 8 using the first manual operator 42, the range of the limit value V, and the like are not limited to the definitions described above.

Figure 7:
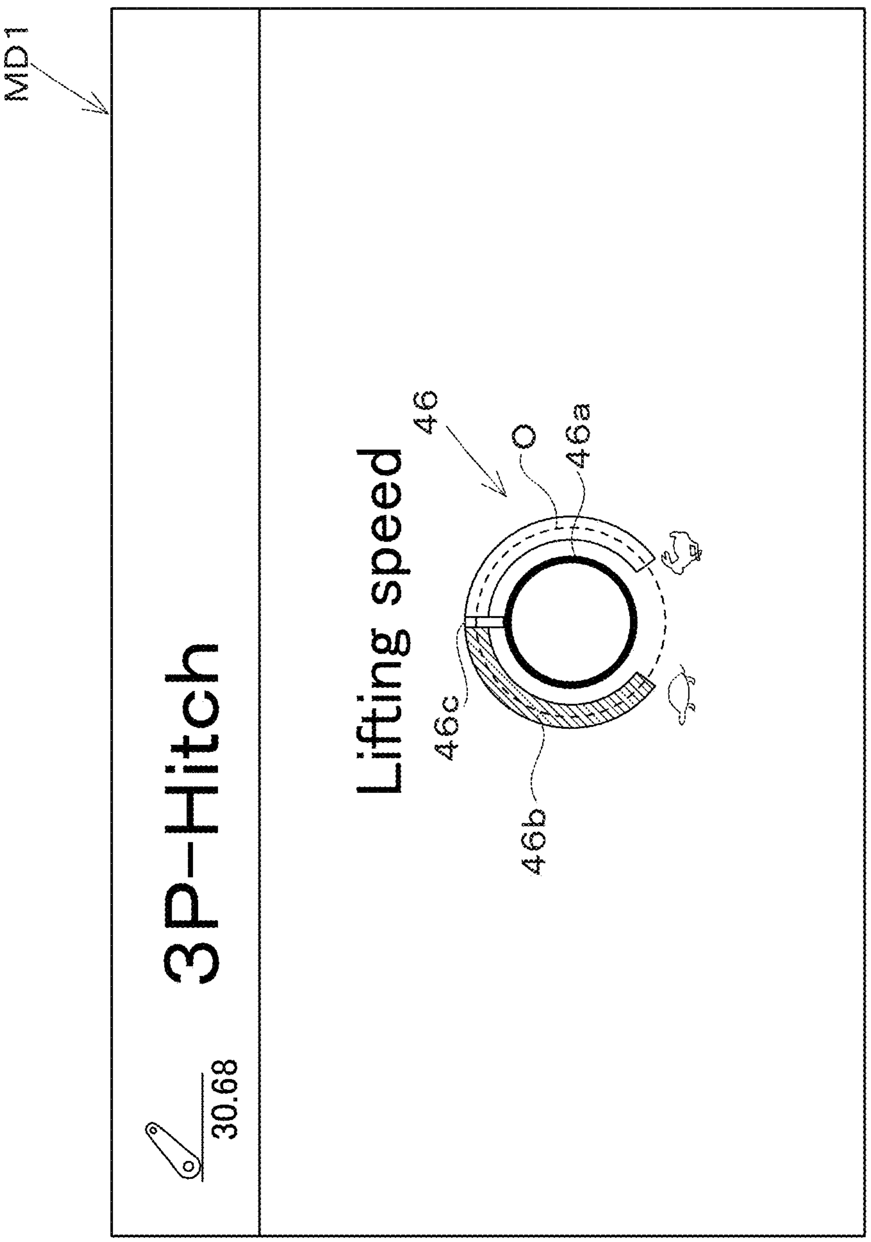
FIG. 7 illustrates an example of a second manual operator.

In the present example embodiment, as illustrated in FIG. 7, the second manual operator 46 is a display image displayed on the display unit 12*a* of the display 12. That is, the display 12 and the jog dial 41 function also as a portion of the operating equipment 10 (second manual operator 46). When the jog dial 41 is operated, the display 12 displays, on the display unit 12*a*, an operation screen MD1 on which the second manual operator 46 is displayed. In the example illustrated in FIG. 7, the second manual operator 46 includes a selection indicating portion 46*a*, a gauge image 46*b*, and an indicator 46*c*.

The selection indicating portion 46*a* is a display image indicating that the second manual operator 46 can be operated by operating the jog dial 41. The selection indicating portion 46*a* changes the manner of indication thereby between the case where the second manual operator 46 can be operated and the case where the second manual operator 46 cannot be operated. In the present example embodiment, the selection indicating portion 46*a* is a display image that has a substantially circular shape. In the present example embodiment, in the case where the second manual operator 46 can be operated, the color and thickness of the outline differ from those in the case where the second manual operator 46 cannot be operated.

The gauge image 46*b* is a long, narrow display image that represents limit values V The gauge image 46*b* is displayed as an arc image that surrounds the selection indicating portion 46*a*. The gauge image 46*b* is provided such that the gauge image 46*b* defines a portion of a circle (imaginary circle O) centered on the center of the selection indicating portion 46*a*. The end of counterclockwise rotation of the gauge image 46*b* represents a limit value V of 0%, and the end of clockwise rotation of the gauge image 46*b* represents a limit value V of 100%. A turtle icon that represents a limit value V of 0% is displayed near the end of the counterclockwise rotation of the gauge image 46*b*, and a rabbit icon that represents a limit value V of 100% is displayed near the end of the clockwise rotation of the gauge image 46*b*.

The indicator 46*c* is a display image to rotate in response to the operation of the jog dial 41. For example, the indicator 46*c* is a display image that is located at least near the gauge image 46*b* and that indicates the current limit value V. Specifically, the indicator 46*c* moves (rotates) along the gauge image 46*b* about the center of the imaginary circle O in response to the operation of the jog dial 41. The indicator 46*c* moves in the clockwise direction along the gauge image 46*b* as the limit value V increases and moves in the counterclockwise direction along the gauge image 46*b* as the limit value V decreases.

The operation of the second manual operator 46 will be described. In the case where the operator operates the jog dial 41 to make the second manual operator 46 operable, the operator can rotate the jog dial 41 in the clockwise direction to move the indicator 46*c* in the clockwise direction to increase the limit value V. On the contrary, the operator can, when the second manual operator 46 can be operated, rotate the jog dial 41 in the counterclockwise direction to move the indicator 46*c* in the counterclockwise direction to reduce the limit value V. The operator confirms the limit value V by pressing the jog dial 41.

The operation signal issued by the second manual operator 46 in response to the operation of the jog dial 41 is outputted from the display 12 to the controller 11.

In the example embodiment described above, the second manual operator 46 is a display image to receive rotation operation and is indirectly operated via the jog dial 41. However, the structure thereof is not limited to the structure described above, provided that at least the limit value V can be controlled. For example, the second manual operator 46 may include a physical dial switch directly operated by the operator without using the jog dial 41.

The limit value V controlled via the second manual operator 46 is stored (kept) in the storing unit 11*a*. Therefore, the controller 11 can acquire the limit value V stored in the storing unit 11*a* even in the case where the starter relay 14 is turned off, and it is not necessary to operate the second manual operator 46 every time the starter relay 14 is turned on (off).

The controller 11 changes the drive speed of the driver 8 in a drive start period (which is a certain period of time starting from the point in time at which the driver 8 starts being driven) (such a drive speed may be referred to as "starting speed"). Specifically, in the case where the limit value V is equal to or more than a threshold, the controller 11 performs a first control in which the controller 11 changes the drive speed of the lifter 8 in the drive start period based on the limit value V. In the case where the limit value V is less than the threshold, the controller 11 performs a second control in addition to the first control such that the controller 11 changes the maximum flow rate MF of the hydraulic fluid to actuate the hydraulic actuator 26 based on the limit value V. The threshold is a predetermined threshold and is 50% in the present example embodiment. The threshold is not limited to 50% but may be, for example, 40% or 60%. The threshold may be stored in the storing unit 11*a* and may be freely changeable by operating, for example, the jog dial 41.

In the present example embodiment, in the case where the lift arm 21 is raised in response to the operation of the first manual operator 42, the controller 11 performs the first control or performs the first control and the second control. In the case where the lift arm 21 is lowered in response to the operation of the first manual operator 42, the controller 11 performs neither the first control nor the second control. In other words, the controller 11 limits the operation of the lifter 8 using the first manual operator 42 in the case where the lift arm 21 is raised, and the controller 11 does not limit the operation of the lifter 8 using the first manual operator 42 in the case where the lift arm 21 is lowered.

The first control will now be described in detail. The controller 11 changes the starting speed of the lifter (driver) 8 based on the limit value V at least when the limit value V is equal to or more than the threshold. In the case where the limit value V is less than the threshold, the controller 11 performs the first control in the same manner as in the case where the limit value V is equal to the threshold. The controller 11 increases the starting speed of the lifter 8 as the limit value V increases and reduces the starting speed of the lifter 8 as the limit value V decreases.

That is, in the present example embodiment, the controller 11 increases the starting speed as the limit value V increases and reduces the starting speed as the limit value V decreases when the limit value V is not less than 50% and not more than 100%, and keeps the starting speed constant in the case where the limit value V is less than 50%.

Specifically, the controller 11 reduces the current value I outputted to the control valve 30 to a greater extent from the current value I acquired based on the second graph M2 as the limit value V decreases toward the threshold, thus changing the starting speed of the lifter 8. For example, the controller 11 corrects the second graph M2 such that the current value I decreases as the limit value V decreases. That is, the controller 11 does not correct the second graph M2 in the first control in the case where the limit value V is 100%, and the extent of correction (the degree of correction) to the second graph M2 in the first control increases in the case where the limit value V is 50% or less.

Figure 8:
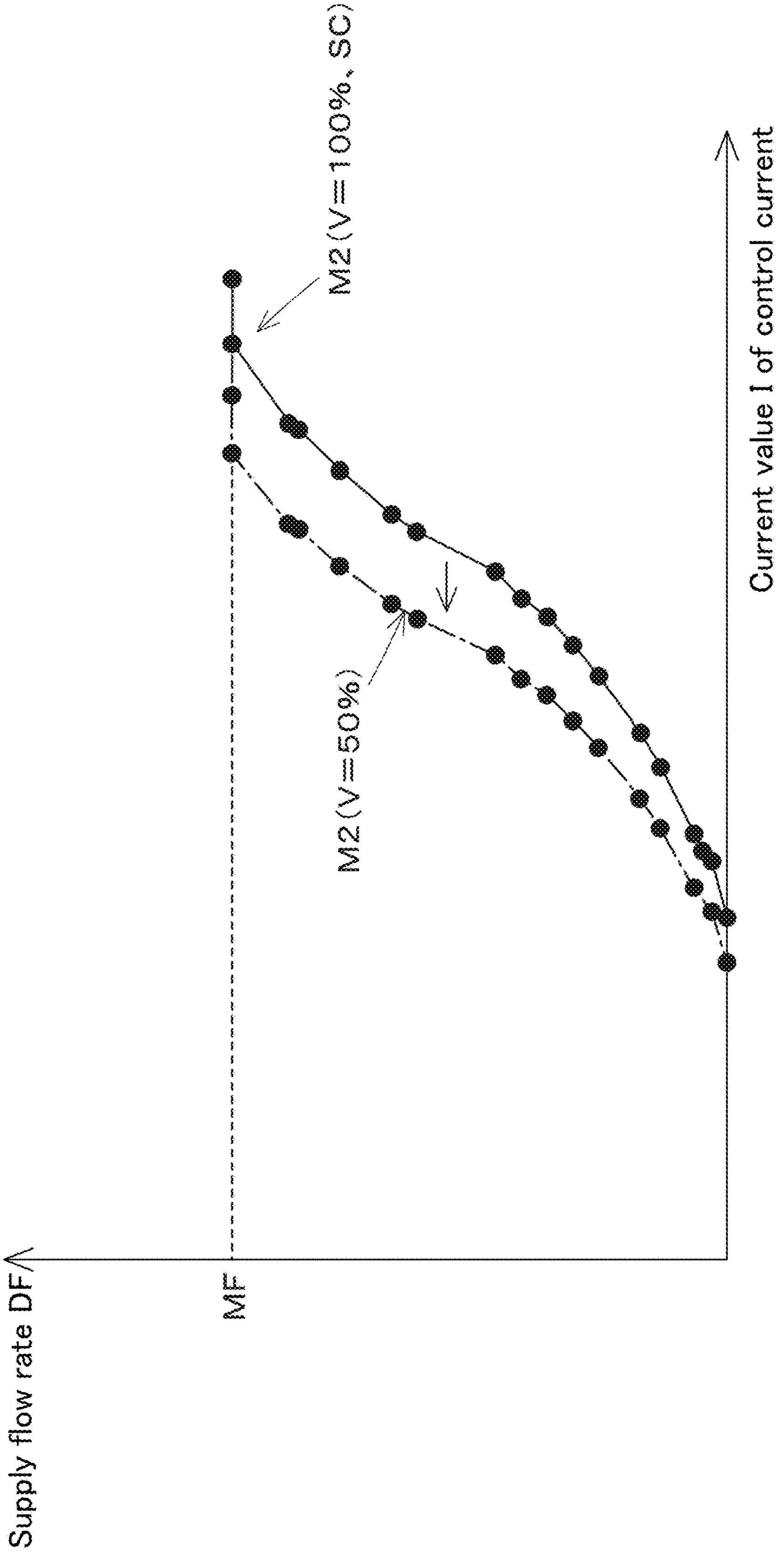
FIG. 8 illustrates a second graph in the case where the limit value is 100% and a second graph in the case where the limit value is 50%.

The controller 11 acquires the current value I based on the corrected second graph M2 and outputs, to the control valve 30, the current value I lower than the current value I acquired based on the uncorrected second graph M2. FIG. 8 illustrates the second graph M2 in the case where the limit value V is 100% and the second graph M2 in the case where the limit value V is 50%. In FIG. 8, the second graph M2 in the case where the limit value V is 100% is represented by a solid line, and the second graph M2 in the case where the limit value V is 50% is represented by a dot-dash line. In the chart illustrated in FIG. 8, the horizontal axis represents the current value I of the control current, and the vertical axis represents the supply flow rate DF.

The controller 11 corrects the current value I of the control current of the second graph M2 using a correction value based on the limit value V such that the current value I decreases as the limit value V decreases toward the threshold. On the contrary, the controller 11 corrects the current value I such that the current value I approaches the current value I of the control current of the uncorrected second graph M2 as the limit value V increases from the threshold.

Therefore, when the controller 11 corrects the second graph M2 using the correction value, as illustrated in FIG. 8, the corrected second graph M2 is shifted such that the current value I approaches zero at a rate corresponding to the correction value. The controller 11 shifts the corrected second graph M2 such that the current value I approaches zero as the limit value V decreases toward the threshold. In other words, the controller 11 causes the corrected second graph M2 to approach the standard flow rate characteristic graph SC as the limit value V increases from the threshold and causes the corrected second graph M2 to move away from the standard flow rate characteristic graph SC as the limit value V decreases from the threshold.

Accordingly, the control valve 30, which received the control current outputted from the controller 11, increases the opening as the limit value V increases from the threshold and reduces the opening as the limit value V decreases toward the threshold, even in the case where the deviation ΔD is the same. In the following description, the current value I acquired based on the corrected second graph M2 is referred to as a corrected current value CI.

The controller 11 acquires a correction graph that is stored in the storing unit 11*a* in advance and that represents the relationship between the correction value and the limit value V, and acquires the correction value based on the correction graph and the limit value V. In the present example embodiment, the correction value is a coefficient by which the current value I of the control current of the uncorrected second graph M2 is multiplied. Therefore, the correction value is the maximum value (1 (one) in the present example embodiment) in the case where the limit value V is 100%. The correction value decreases as the limit value V decreases toward the threshold and is the minimum value in the case where the limit value V is 50% or less.

More specifically, the correction value in the case where the limit value V is equal to or less than the threshold (the minimum value of the correction value) is defined using (i) the current value I of the control current at a predetermined supply flow rate (reference supply flow rate BF) on the flow rate characteristic graph (maximum flow rate characteristic graph UC) of a maximum-flow-rate control valve 30 that is higher in the supply flow rate DF than the standard flow rate characteristic graph SC and (ii) the current value I of the control current at the predetermined supply flow rate on the standard flow rate characteristic graph SC. The reference supply flow rate BF is a flow rate of fluid that at least can be supplied to the control valve 30 and supplied from the control valve 30, which can be affected by, for example, manufacturing errors of device included in a hydraulic system such as the hydraulic pump P.

Figure 9:
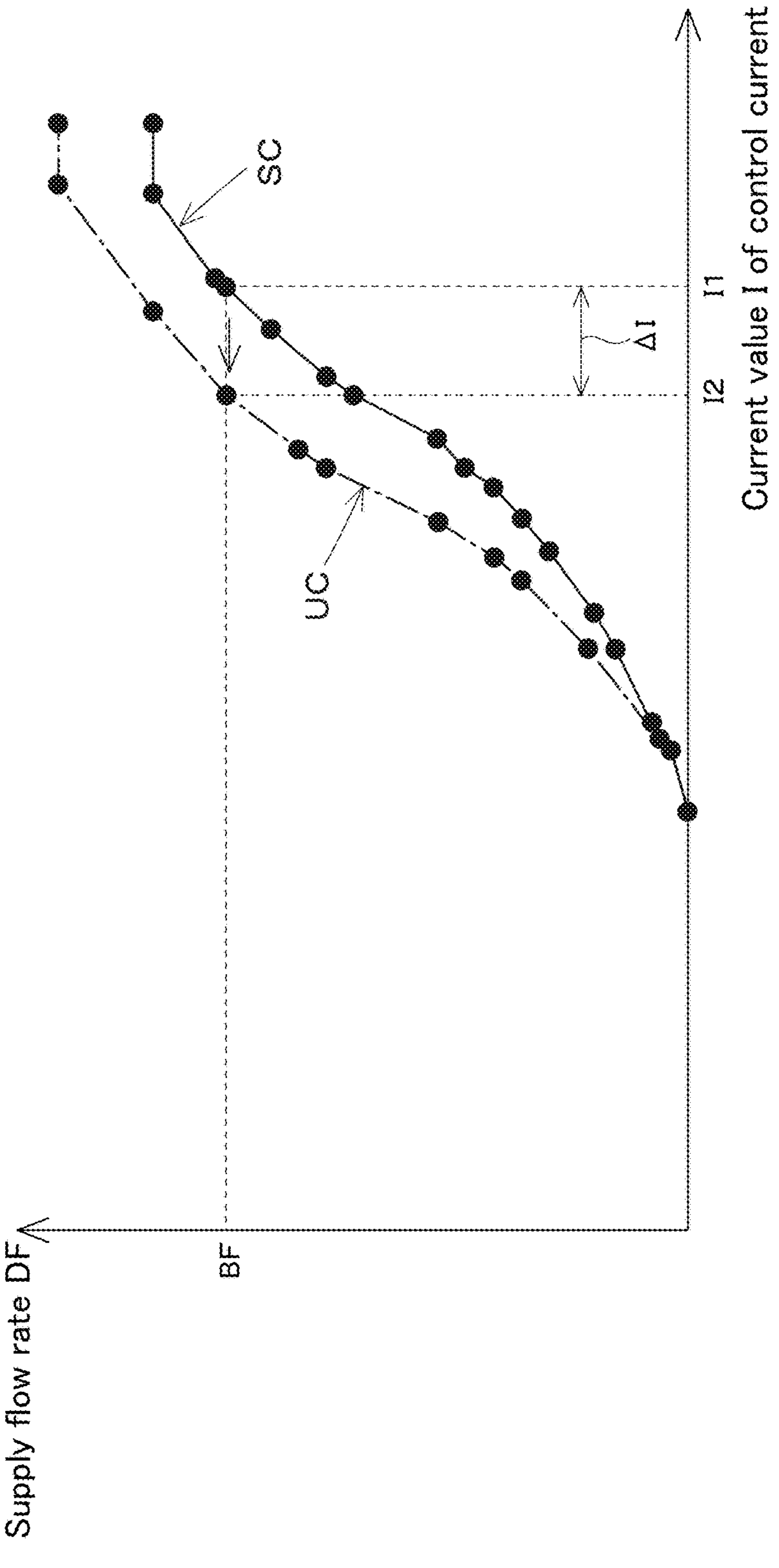
FIG. 9 illustrates a standard flow rate characteristic graph and a maximum flow rate characteristic graph.

FIG. 9 illustrates the standard flow rate characteristic graph SC and the maximum flow rate characteristic graph UC. In FIG. 9, the standard flow rate characteristic graph SC is represented by a solid line, and the maximum flow rate characteristic graph UC is represented by a dot-dash line. In the chart illustrated in FIG. 9, the horizontal axis represents the current value I of the control current, and the vertical axis represents the supply flow rate DF.

The maximum flow rate characteristics UC are the flow rate characteristics of the maximum-flow-rate control valve 30, and are, for example, flow rate characteristics of designed data or theoretical data. That is, the maximum flow rate characteristics UC are designed or theoretical flow rate characteristics of the maximum-flow-rate control valve 30. The maximum flow rate characteristics UC may be acquired by performing arithmetic processing such as averaging or standardization on the measured data of flow rate characteristics measured regarding a plurality of control valves 30. That is, the maximum flow rate characteristics UC may be based on a plurality of pieces of measured data.

In the case where the supply flow rate DF is the reference supply flow rate BF, assuming that the current value I of the control current on the standard flow rate characteristic graph SC is a first current value I1 and the current value I of the control current on the maximum flow rate characteristic graph UC is a second current value 12, the minimum value of the correction value is defined as the ratio of the second current value 12 to the first current value I1. Therefore, for example, in the case where the first current value I1 is 2500 mA and the second current value 12 is 2100 mA, the minimum value of the correction value is 0.84. Therefore, in the case where the limit value V is 50% or less, the correction value is 0.84, and the corrected current value CI is lower than the current value I of the control current in the case where the limit value V is 100% by 0.16% (the ratio of the absolute value ΔI of the difference between the first current value I1 and the second current value 12 to the first current value I1).

In the present example embodiment, the correction value increases within the range of from 0.84 to 1 inclusive when the limit value V increases from 50% to 100%. For example, the correction value proportionally increases as the limit value V increases from 50% to 100%. Therefore, for example, in the case where the limit value V is 75%, the correction value is 0.92.

The correction value may not be proportional, provided that the correction value increases as the limit value V at least increases from 50% to 100%.

In the example embodiment described above, the controller 11 acquires the correction graph stored in advance in the storing unit 11*a* and acquires the correction value based on the correction graph. However, the controller 11 may be configured or programmed to calculate the correction value based on a predetermined arithmetic expression every time the limit value V is changed and perform the first control, provided that the minimum value of the correction value is defined using the ratio of the second current value 12 to the first current value I1 and increases as the limit value V at least increases from 50% to 100%.

In the example embodiment described above, the controller 11 corrects the second graph M2 using the correction value. However, the controller 11 may be configured or programmed to, at least in the first control, correct, using a correction value, the current value I acquired based on the second graph M2 instead of correcting the second graph M2, provided that the controller 11 outputs, to the control valve 30, the current value I that decreases from the current value I acquired based on the second graph M2 as the limit value V decreases toward the threshold. In such a case, the controller 11 corrects the current value I of the control current acquired based on the second graph M2 using the correction value based on the limit value V, so that the current value I decreases as the limit value V decreases toward the threshold. On the contrary, the controller 11 corrects the current value I such that the current value I approaches the current value I of the control current acquired based on the second graph M2 as the limit value V increases from the threshold.

The controller 11 increases the maximum flow rate MF as the limit value V increases and reduces the maximum flow rate MF as the limit value V decreases, in the second control. The maximum flow rate MF described herein refers to the maximum value of the flow rate of the hydraulic fluid that can be supplied by the control valve 30 under control by the controller 11. In the present example embodiment, the controller 11 corrects the second graph M2 based on the limit value V to change the maximum flow rate MF of the hydraulic fluid to actuate the hydraulic actuator 26. That is, in the case where the limit value V is less than the threshold, the second control is performed in addition to the first control. To this end, when the limit value V decreases from a value equal to or more than the threshold to a value less than the threshold, the controller 11 further corrects, in the second control that differs from the first control, the corrected second graph M2 corrected in the first control.

The controller 11 acquires a limit flow rate CF based on the limit value V and corrects the second graph M2 based on the limit flow rate CF. For example, the controller 11 acquires a limit graph that is stored in advance in the storing unit 11*a* and that represents the relationship between the limit flow rate CF and the limit value V, and acquires the limit flow rate CF based on the limit graph and the limit value V. The limit flow rate CF decreases as the limit value V decreases and is proportional to the limit value V.

The limit flow rate CF when the limit value V is 0%, that is, the minimum value of the limit flow rate CF, is a flow rate equal to 50% of the maximum flow rate MF of the uncorrected second graph M2. The limit flow rate CF when the limit value V is 25% is a flow rate equal to 75% of the maximum flow rate MF of the uncorrected second graph M2.

Therefore, when the maximum flow rate MF of the second graph M2 in the case where the limit value V is 100% is 100 L/min, the limit flow rate CF when the limit value V is 25% is 75 L/min, and the limit flow rate CF when the limit value V is 0% is 50 L/min.

Figure 10:
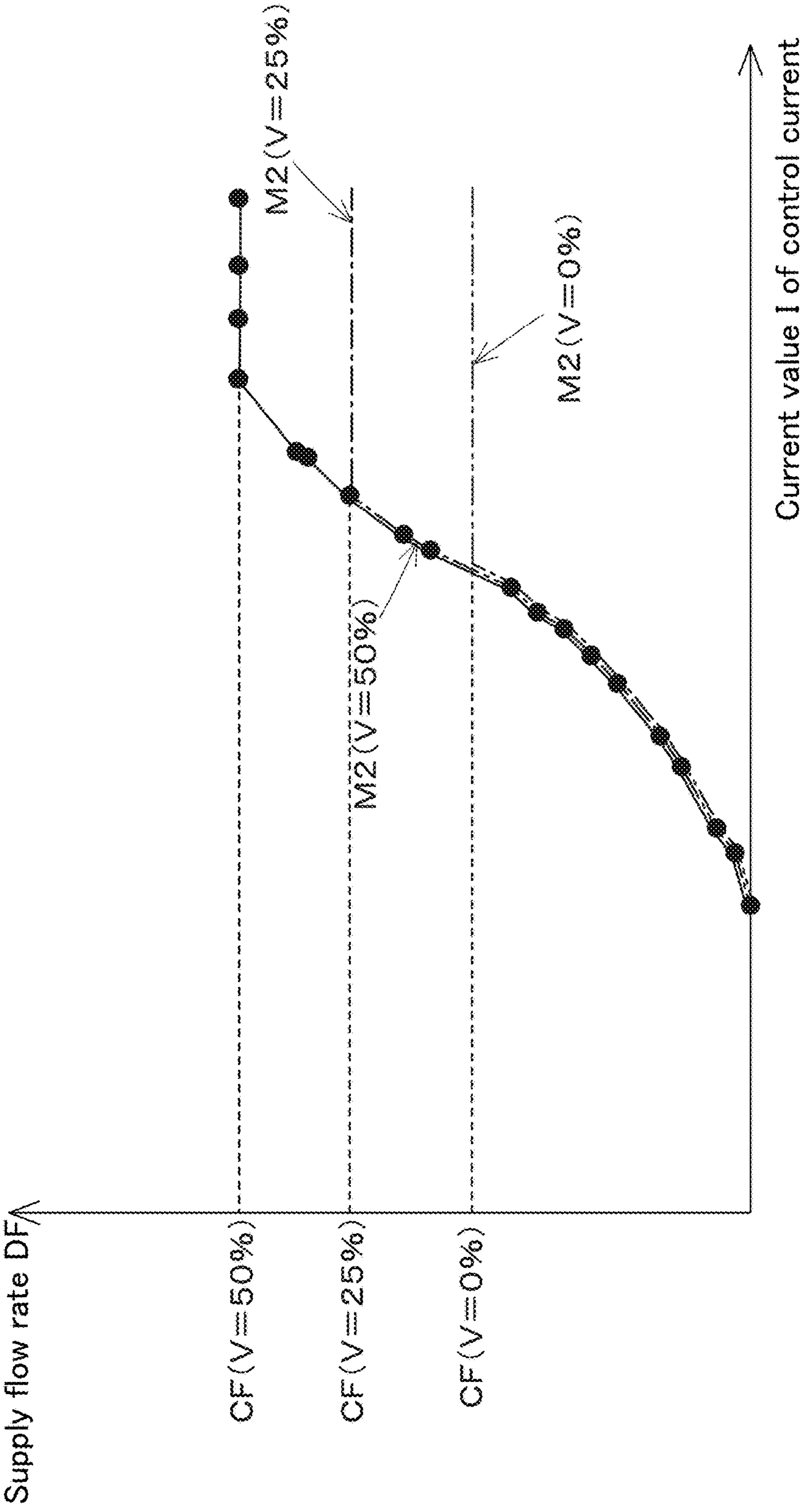
FIG. 10 illustrates a second graph in the case where the limit value is 50%, a second graph in the case where the limit value is 25%, and a second graph in the case where the limit value is 0%.

FIG. 10 illustrates the second graph M2 in the case where the limit value V is 50%, the second graph M2 in the case where the limit value V is 25%, and the second graph M2 in the case where the limit value V is 0%. In FIG. 10, the second graph M2 in the case where the limit value V is 50% is represented by a solid line. The second graph M2 in the case where the limit value V is 25% is represented by a dot-dash line. The second graph M2 in the case where the limit value V is 0% is represented by a dot-dot-dash line. In the chart illustrated in FIG. 10, the horizontal axis represents the current value I of the control current, and the vertical axis represents the supply flow rate DF.

The controller 11 further corrects the second graph M2 corrected in the first control to correct the supply flow rate DF higher than the limit flow rate CF to the limit flow rate CF. Therefore, as illustrated in FIG. 10, the second graph M2 corrected in the first control and the second control is 75 L/min or less in the case where the limit value V is 25% and is 50 L/min or less in the case where the limit value V is 0%.

Accordingly, in the case where the limit value V is less than 50%, the controller 11 corrects the second graph M2 and acquires the current value I of the control current based on the target flow rate TF acquired from the first graph M1 and on the corrected second graph M2. In the case where the maximum flow rate MF (limit flow rate CF) of the corrected second graph M2 is less than the target flow rate TF, the controller 11 acquires the current value I at which the supply flow rate DF is equal to the maximum flow rate ME.

Note that the limit flow rate CF may not be proportional, provided that the limit flow rate CF decreases as the limit value V at least decreases from 50% to 0%.

The controller 11 may correct the first graph M1 instead of the second graph M2, provided that the controller 11 increases the maximum flow rate MF as the limit value V increases and reduces the maximum flow rate MF as the limit value V decreases, in the second control.

In the example embodiment described above, the controller 11 acquires the limit graph that is stored in advance in the storing unit 11*a* and acquires the limit flow rate CF from the limit graph. However, the controller 11 may calculate the limit flow rate CF using a predetermined arithmetic expression every time the limit value V is changed and perform the second control, provided that the limit flow rate CF decreases as the limit value V at least decreases from 50% to 0%.

Figure 11:
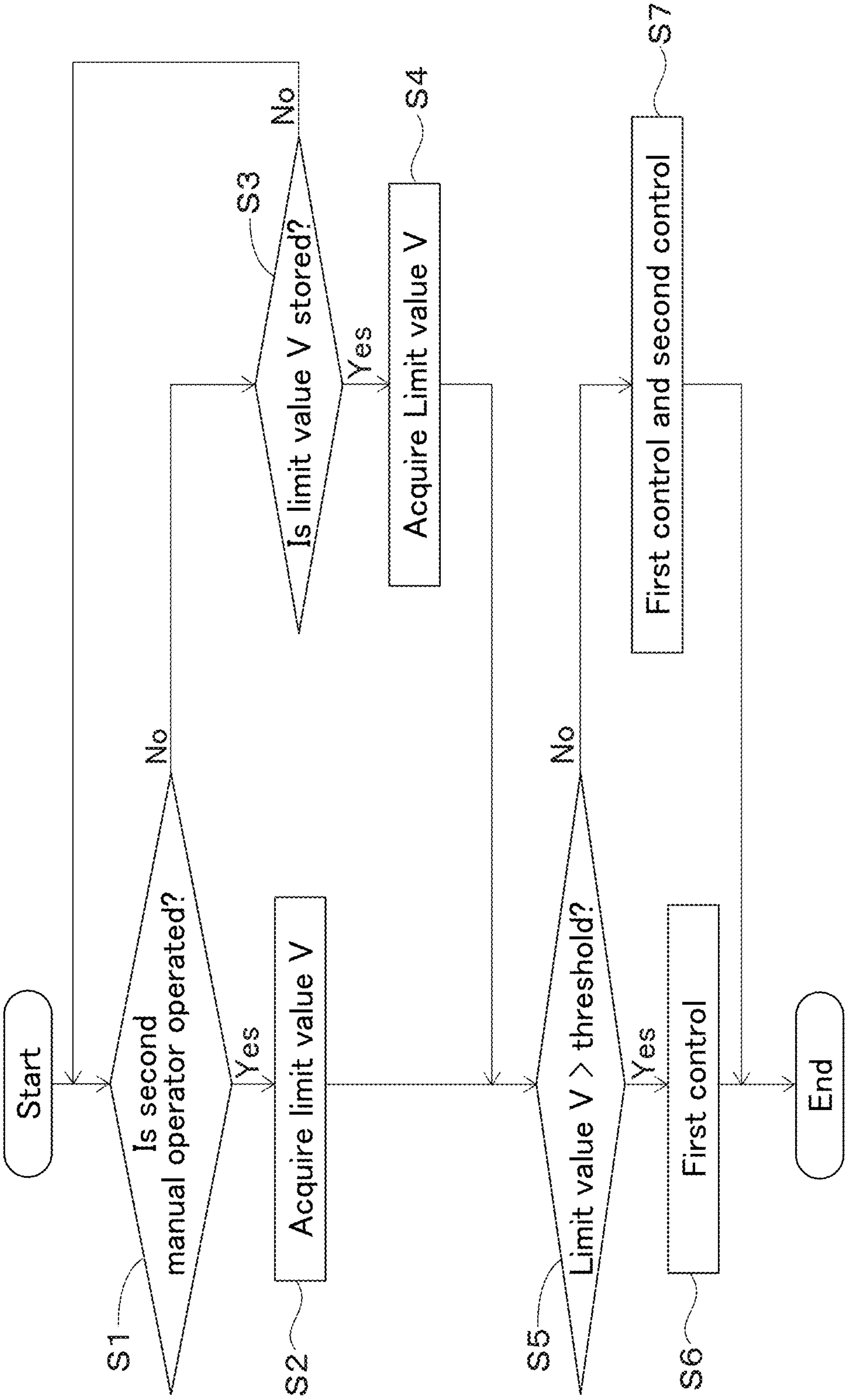
FIG. 11 illustrates a flow including steps in a first control and a second control that are performed by a controller.

The following discusses a flow including steps in the first control and the second control that are performed by the controller 11. FIG. 11 illustrates the flow including steps in the first control and the second control that are performed by the controller 11. The steps illustrated in FIG. 11 are performed by CPU(s) based on software program(s) stored in advance in the storing unit 11*a* of the controller 11. The controller 11 first determines whether the second manual operator 46 is operated (S1). The controller 11 acquires the operation signal from the second manual operator 46 and, if it is determined that the second manual operator 46 is operated (Yes at S1), acquires a limit value V based on the operation signal (S2). The controller 11, after acquiring the limit value Vat S2, causes the storing unit 11*a* to store the limit value V If it is determined that the second manual operator 46 is not operated (No at S1), the controller 11 determines whether the storing unit 11*a* stores a limit value V (S3).

If it is determined that a limit value V is stored in the storing unit 11*a* (Yes at S3), the controller 11 acquires the limit value V (S4). The controller 11, after acquiring the limit value V at S2 or S4, determines whether the limit value V is equal to or more than the threshold (S5).

If it is determined that the limit value V is equal to or more than the threshold (Yes at S5), the controller 11 performs the first control based on the acquired limit value V (S6, or a first step). If it is determined that the limit value V is less than the threshold (No at S5), the controller 11 performs the first control and the second control based on the acquired limit value V (S7, or a second step).

This allows the operator to control the limit value V by using the second manual operator 46, thus performing the first control by which the drive speed of the lifter 8 in the drive start period is changed. The operator, by operating the second manual operator 46 to reduce the limit value V to a value less than the threshold, is able to perform the second control that differs from the first control in addition to the first control to further reduce the drive speed of the lifter 8. Therefore, with the operation of the second manual operator 46, the working machine 1 is capable of appropriately adjusting the balance between reducing the occurrence of a shocks in the drive start period and work efficiency of the lifter 8.

Second Example Embodiment

Figure 12:
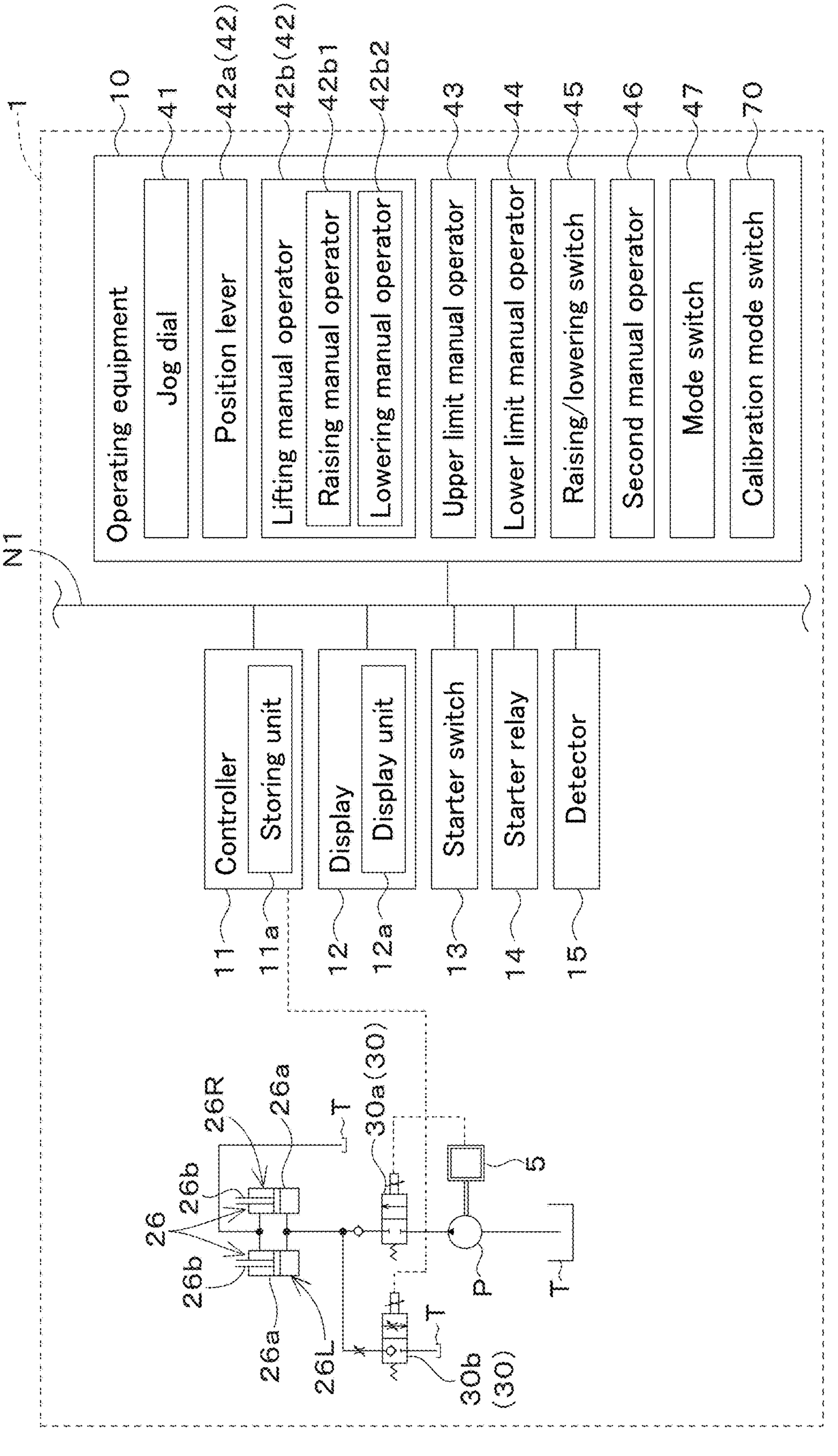
FIG. 12 illustrates a control system of a working machine according to a second example embodiment of the present invention.

FIG. 12 illustrates a working machine 1 and a method of controlling a working machine 1 according to another example embodiment (second example embodiment). Mainly differences between the working machine 1 and the method of controlling a working machine 1 according to the second example embodiment and those according to the example embodiment described above (first example embodiment) will now be described, elements which are the same as those according to the first example embodiment will be assigned identical reference signs, and the detailed description thereof is omitted.

In the second example embodiment, the controller 11 performs a first control that differs from the first control according to the first example embodiment, and changes the drive speed of the driver 8 in the drive start period based on the limit value V. In particular, in the first control according to the first example embodiment, the second graph M2 or the current value I of control current is corrected based on the limit value V, so that the drive speed of the driver 8 in the drive start period is changed. However, the first control according to the second example embodiment differs from the first control according to the first example embodiment in that the second graph M2 or the current value I is not corrected.

Specifically, in the second example embodiment, the controller 11 performs the first control such that the controller 11 counts an elapsed time t from when the first manual operator 42 is operated and the driver 8 starts being driven, and limits the target flow rate TF to a greater extent as the elapsed time t decreases.

Specifically, the controller 11 can detect whether the first manual operator 42 is operated based on the operation signal outputted from the potentiometer and measure the elapsed time t from when the first manual operator 42 is operated via, for example, a timer provided in the controller 11. The timer measures the elapsed time t from when the first manual operator 42 is operated, and resets the measured elapsed time t if it is detected that the first manual operator 42 is not operated.

Figure 13:
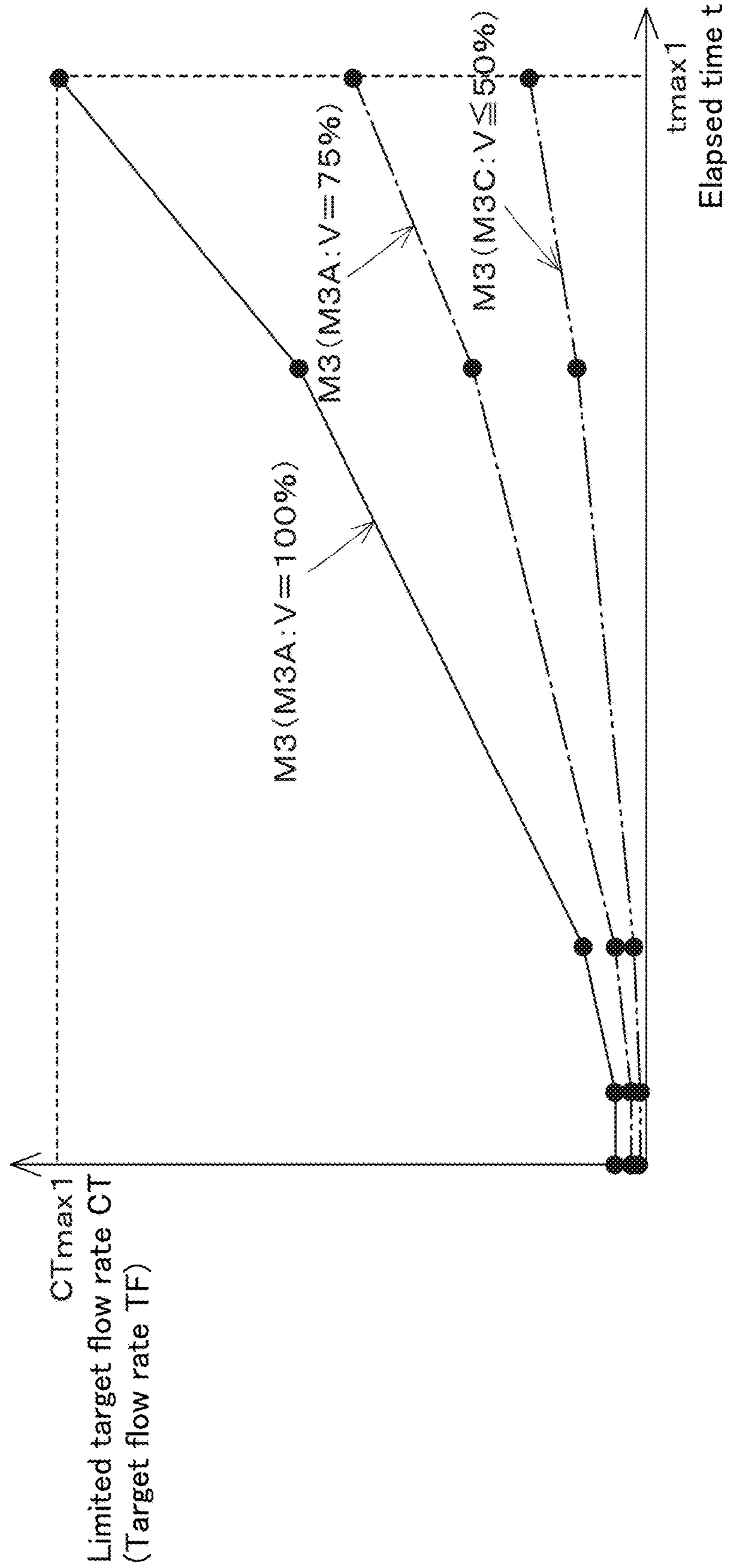
FIG. 13 illustrates examples of a third graph (standard graph).

The controller 11 limits the target flow rate TF based on a third graph M3 in the first control. FIG. 13 illustrates an example of the third graph M3. In FIG. 13, the third graph M3 in the case where the limit value V is 100% is represented by a solid line. The third graph M3 in the case where the limit value V is 75% is represented by a dot-dash line. The third graph M3 in the case where the limit value V is 50% or less is represented by a dot-dot-dash line. As illustrated in FIG. 13, the third graph M3 is a graph (chart) that represents the relationship between the elapsed time t and the target flow rate TF. In the chart illustrated in FIG. 13, the horizontal axis represents the elapsed time t, and the vertical axis represents the target flow rate TF of the hydraulic fluid to actuate the hydraulic actuator 26.

In the following description, the target flow rate TF defined by the third graph M3 is referred to as a "limited target flow rate CT". In the example of the third graph M3 illustrated in FIG. 13, the limited target flow rate CT changes such that the limited target flow rate CT increases gradually and then increases sharply as the elapsed time t increases. The third graph M3 is stored in the storing unit 11*a* in advance. Therefore, the controller 11 acquires the limited target flow rate CT from the third graph M3 based on the elapsed time t and limits the target flow rate TF using the acquired limited target flow rate CT.

That is, in the case where the limited target flow rate CT acquired from the third graph M3 is more than the target flow rate TF acquired based on the operation signal from the manual operator and the first graph M1, the controller 11 limits the target flow rate TF to the limited target flow rate CT and acquires the current value I of the control current based on the limited target flow rate CT and the second graph M2. In the case where the elapsed time t is more than the maximum value tmax1 in the range of the elapsed time t defined by the third graph M3, the controller 11 performs the first control based on the limited target flow rate CT corresponding to the maximum value tmax1.

The third graphs M3 illustrated in FIG. 13 are merely examples. In the examples illustrated in FIG. 13, each third graph M3 includes a plurality of sections that have different slopes. The third graph M3 may increase to define a curve convex downward or proportionally increase to define a substantially straight line as the elapsed time t increases, provided that the third graph M3 changes at least such that the limited target flow rate CT increases as the elapsed time t increases.

The controller 11 acquires the third graph M3 in which the limited target flow rate CT against the elapsed time t is smaller as the limit value V decreases toward the threshold in the first control. In the present example embodiment, the storing unit 11*a* stores the third graph(s) M3 corresponding to the respective limit value(s) V, and the controller 11 acquires, based on a limit value V, the third graph M3 corresponding to that limit value V from the storing unit 11*a*. A plurality of the third graphs M3 are each defined by multiplying a predetermined reference graph by a value (reduction rate) corresponding to the magnitude of the limit value V. For example, the reduction rate is substantially proportional to the limit value V and is defined such that the reduction rate decreases as the limit value V decreases. An example of the reference graph is the third graph M3 in the case where the limit value V is 100%.

Therefore, the plurality of third graphs M3 are defined such that, as the limit value V decreases toward the threshold, the limited target flow rate CT against the elapsed time t decreases. That is, the third graph M3 in which the limited target flow rate CT is the maximum is the third graph M3 in the case where the limit value V is 100%, and the third graph M3 in which the limited target flow rate CT is the minimum is the third graph M3 in the case where the limit value V is 50% or less.

The limited target flow rate CT of the third graph M3 for a predetermined limit value V (first limit value) is higher than the limited target flow rate CT of the third graph M3 for a limit value V lower than the first limit value (second limit value) at any elapsed time t. That is, the third graph M3 for the first limit value does not intersect the third graph M3 for the second limit value at any elapsed time t.

In the example illustrated in FIG. 13, the third graph M3 in the case where the limit value V is 75% is defined by multiplying the reference graph (the third graph M3 in the case where the limit value V is 100%) by a reduction rate of 0.6. The third graph M3 in the case where the limit value V is 50% or less is defined by multiplying the reference graph by a reduction rate of 0.2.

The reduction rate may not be proportional, provided that the reduction rate is defined such that it decreases as the limit value V decreases.

In the example embodiment described above, the controller 11 acquires a third graph M3 stored in advance in the storing unit 11*a* based on the limit value V. However, the controller 11 may calculate the third graph M3 from the reference graph based on a predetermined arithmetic expression every time the limit value V is changed and perform the first control, provided that the controller 11 acquires the third graph M3 in which the target flow rate TF against the elapsed time t decreases as the limit value V decreases toward the threshold, in the first control.

Figure 14:
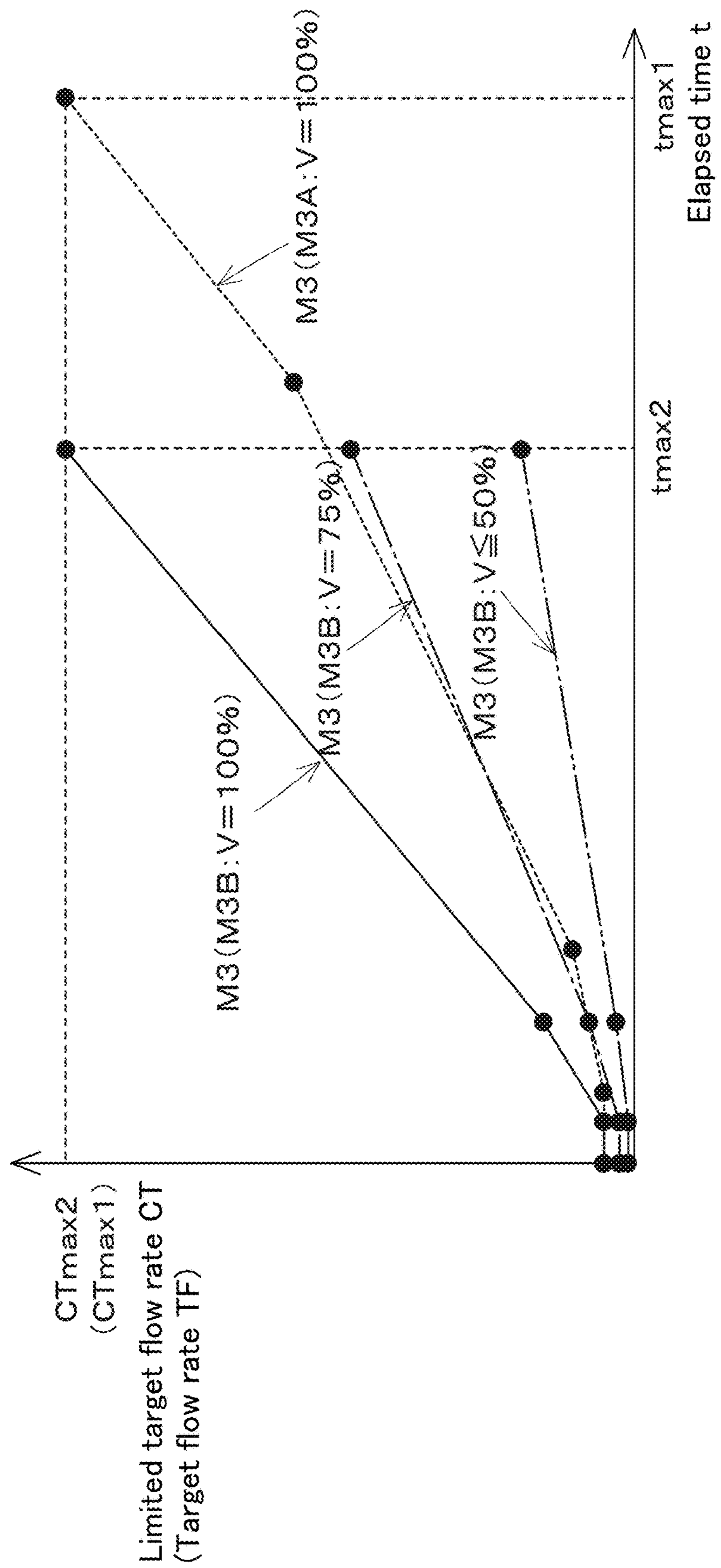
FIG. 14 illustrates examples of a third graph (first change graph).

The controller 11 may acquire the third graph M3 that differs depending on the content of work performed by the working device 3. In the present example embodiment, in the case of work performed such that the lifter 8 causes the working device 3 like a towed cultivator such as a subsoiler, a plow, or a cultivator to contact the ground and the towed cultivator is towed (such work is referred to as towing work), the controller 11 may acquire the third graph M3 as illustrated in FIG. 14 (hereinafter referred to as a first change graph M3B for convenience of description) instead of the third graph M3 illustrated in FIG. 13 (hereinafter referred to as a standard graph M3A for convenience of description). As illustrated in FIG. 14, the first change graph M3B is a graph (chart) that represents the relationship between the elapsed time t and the target flow rate TF similarly to the standard graph M3A illustrated in FIG. 13. In the chart illustrated in FIG. 14, the horizontal axis represents the elapsed time t, and the vertical axis represents the target flow rate TF of the hydraulic fluid to actuate the hydraulic actuator 26.

In an example illustrated in FIG. 14, the first change graph M3B in the case where the limit value V is 100% is represented by a solid line, and the first change graph M3B in the case where the limit value V is 75% is represented by a dot-dash line. In the example illustrated in FIG. 14, the first change graph M3B in the case where the limit value V is 50% or less is represented by a dot-dot-dash line. In the example illustrated in FIG. 14, the standard graph M3A in the case where the limit value V is 100% is represented by a dashed line for comparison.

In the present example embodiment, the controller 11 determines whether the working device 3 is a towed cultivator, based on whether the function that is used in the case where the working device 3 is a towed cultivator is enabled or disabled, and acquires the standard graph M3A or the first change graph M3B. Specifically, the controller 11 can switch between a position mode which is a standard mode and a draft mode which is used in the case where the working device 3 is a towed cultivator.

In the position mode, the controller 11 performs a position control in which the lifter 8 is operated by operating the first manual operator 42. On the contrary, in the draft mode, the controller 11 performs a draft control in which the lifter 8 is operated by operating the first manual operator 42 and is also raised and lowered automatically depending on the towing load on the working device 3 so that a predetermined towing load is maintained. That is, the draft mode is enabled when performing work in which the working machine 1 tows a towed cultivator such as a subsoiler, a plow, or a cultivator and thus a load occurs.

The position mode and the draft mode are switched by a mode switch 47 which is a portion of the operating equipment 10. Examples of the mode switch 47 include a push button switch such as a tactile switch and a seesaw switch. The mode switch 47 is connected to the controller 11 and outputs an operation signal to the controller 11. The controller 11 switches between the position mode and the draft mode based on the operation signal, that is, based on the operation of the mode switch 47.

The mode switch 47 is described above is merely an example. The controller 11 may switch between the position mode and the draft mode based on information inputted via the display 12.

As illustrated in FIGS. 13 and 14, the first change graph M3B is defined such that the slope of the target flow rate TF against the elapsed time t is greater than that of the standard graph M3A when the limit value V is the same. That is, in the case where the controller 11 performs the first control in the draft mode, the target flow rate TF at the same elapsed time t is limited to a lesser extent than the case where the controller 11 performs the first control in the position mode. The maximum value tmax2 in the range of the elapsed time t defined by the first change graph M3B is lower than the maximum value tmax1 in the range of the elapsed time t defined by the standard graph M3A.

The limited target flow rates CT at the maximum values tmax1 and tmax2 in the range of the elapsed time t (maximum target flow rates CTmax1 and CTmax2) are the same between the first change graph M3B and the standard graph M3A when the limit value V is the same. Therefore, the drive speed of the driver 8 in the drive start period in the draft mode is higher than that in the position mode in the case where the deviation ΔD between the actual position and the target value is the same at the same elapsed time t.

In the example embodiment described above, the controller 11 determines that the content of work performed by the working machine 1 is towing work depending on whether a function of the working machine 1 is enabled or disabled. However, the display 12 may receive input of the content of work, and the controller 11 may acquire the content of work and may determine whether the content is towing work. A method of determination thereof is not limited to the methods described above.

Figure 15:
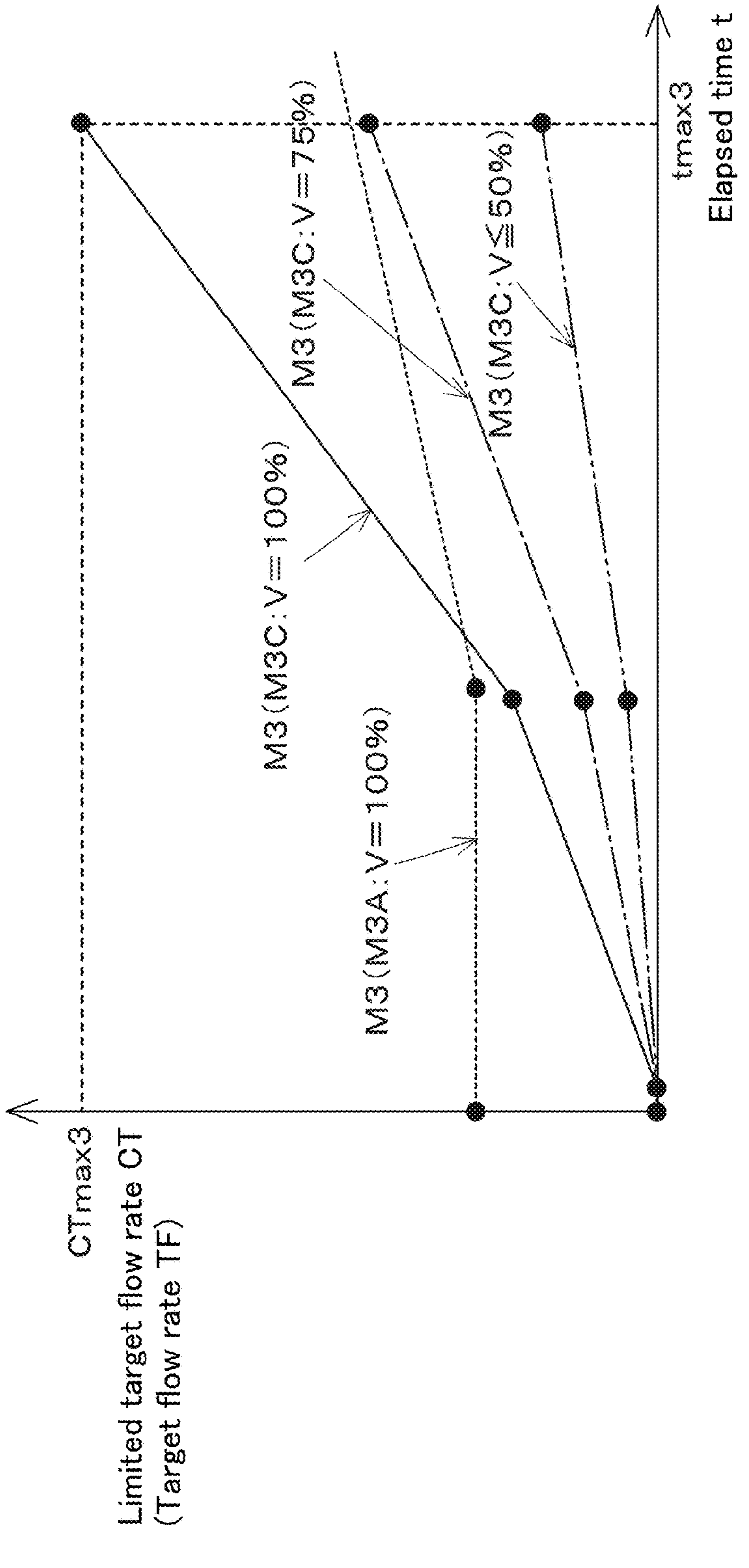
FIG. 15 illustrates examples of a third graph (second change graph).

The controller 11 may be configured or programmed to, when the inner manual operator 42*a* is operated, acquire the third graph M3 that differs from when the outer manual operator 42*b* is operated. In the present example embodiment, the controller 11 may acquire the standard graph M3A illustrated in FIG. 13 when the inner manual operator (position lever) 42*a* is operated and may acquire a third graph M3 as illustrated in FIG. 15 (hereinafter referred to as a second change graph M3C for convenience of description) instead of the standard graph M3A when the outer manual operator (lifting manual operator) 42*b* is operated. As illustrated in FIG. 15, the second change graph M3C is a graph (chart) that represents the relationship between the elapsed time t and the target flow rate TF similarly to the standard graph M3A illustrated in FIG. 13. In the chart illustrated in FIG. 15, the horizontal axis represents the elapsed time t, and the vertical axis represents the target flow rate TF of the hydraulic fluid to actuate the hydraulic actuator 26.

In the example illustrated in FIG. 15, the second change graph M3C in the case where the limit value V is 100% is represented by a solid line, and the second change graph M3C in the case where the limit value V is 75% is represented by a dot-dash line. In the example illustrated in FIG. 15, the second change graph M3C in the case where the limit value V is 50% or less is represented by a dot-dot-dash line. In the example illustrated in FIG. 15, the standard graph M3A in the case where the limit value V is 100% is represented by a dashed line for comparison.

In the present example embodiment, the controller 11 determines whether the position lever 42*a* is operated or the lifting manual operator 42*b* is operated based on the operation signal outputted from the position lever 42*a* and the operation signal outputted from the lifting manual operator 42*b*.

As illustrated in FIGS. 13 and 15, the second change graph M3C is defined such that the slope of the target flow rate TF against the elapsed time t is greater than the standard graph M3A when the limit value V is the same. That is, the controller 11 limits the target flow rate TF to a lesser extent in the case where the controller 11 performs the first control in the draft mode than the case where the controller 11 performs the first control in the position mode, at the same elapsed time t.

The maximum value tmax3 in the range of the elapsed time t defined by the second change graph M3C is lower than the maximum value tmax1 in the range of the elapsed time t defined by the standard graph M3A. The maximum target flow rates CTmax1 and CTmax3 at the maximum values tmax1 and tmax3 in the range of the elapsed time t are lower in the second change graph M3C than in the standard graph M3A.

Therefore, the drive speed of the driver 8 in the drive start period when the lifting manual operator 42*b* is operated can be higher than that when the position lever 42*a* is operated, and the operation can be performed more finely, in the case where the deviation ΔD between the actual position and the target value is the same at the same elapsed time t.

With the first control according to the second example embodiment, the current value I acquired based on the second graph M2 or the second graph M2 is not corrected, but the drive speed of the driver 8 in the drive start period can be appropriately changed based on the elapsed time t from when the driver 8 starts being driven, differently from the first control according to the first example embodiment. Therefore, even if the controller 11 corrects the current value I during a process that differs from the first control and the second control, it is possible to prevent or reduce the complication of the process to calculate the current value I.

Figure 16:
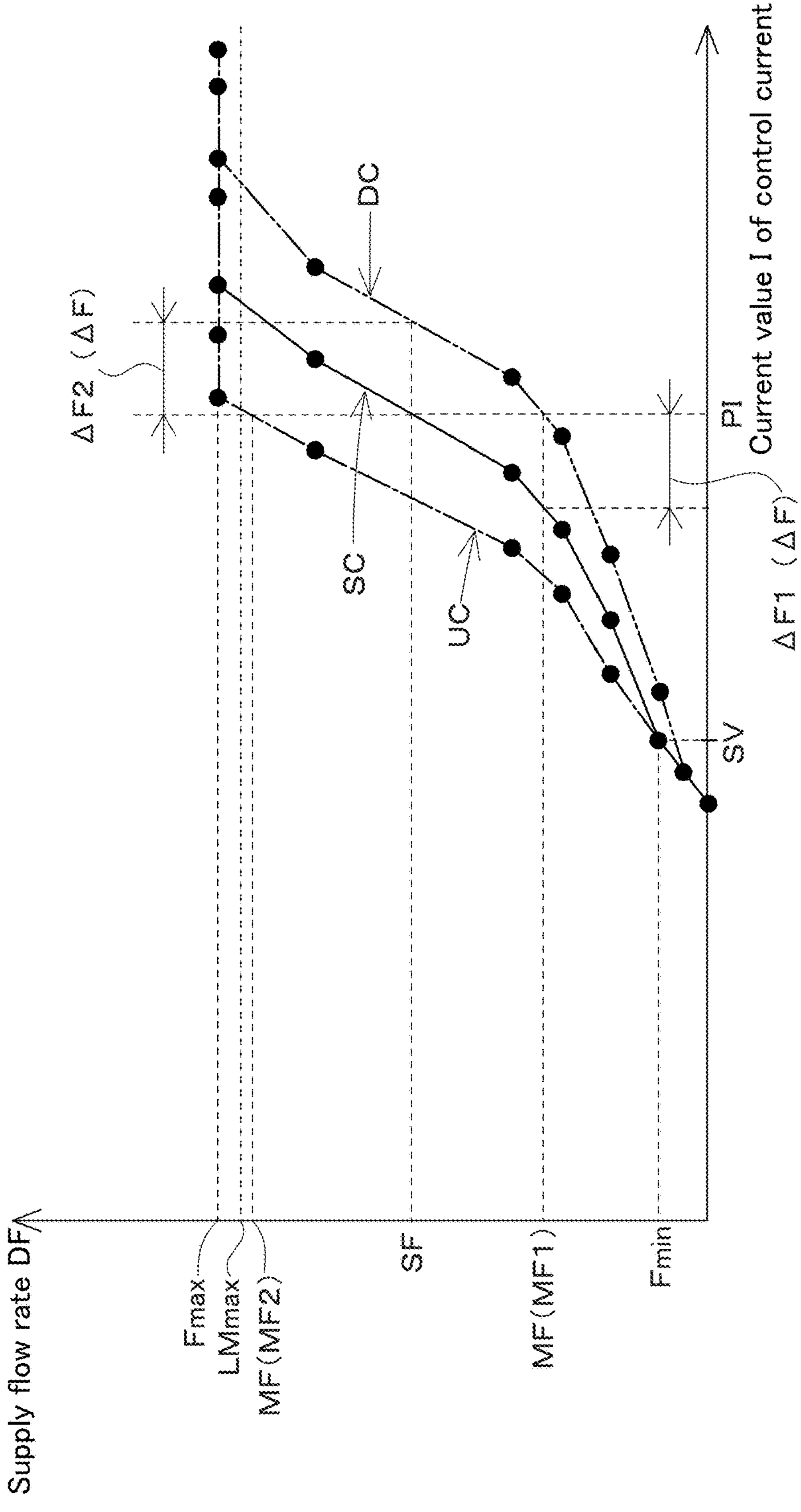
FIG. 16 illustrates an example of a standard flow rate characteristic graph, a maximum flow rate characteristic graph, and a minimum flow rate characteristic graph.
Figure 17:
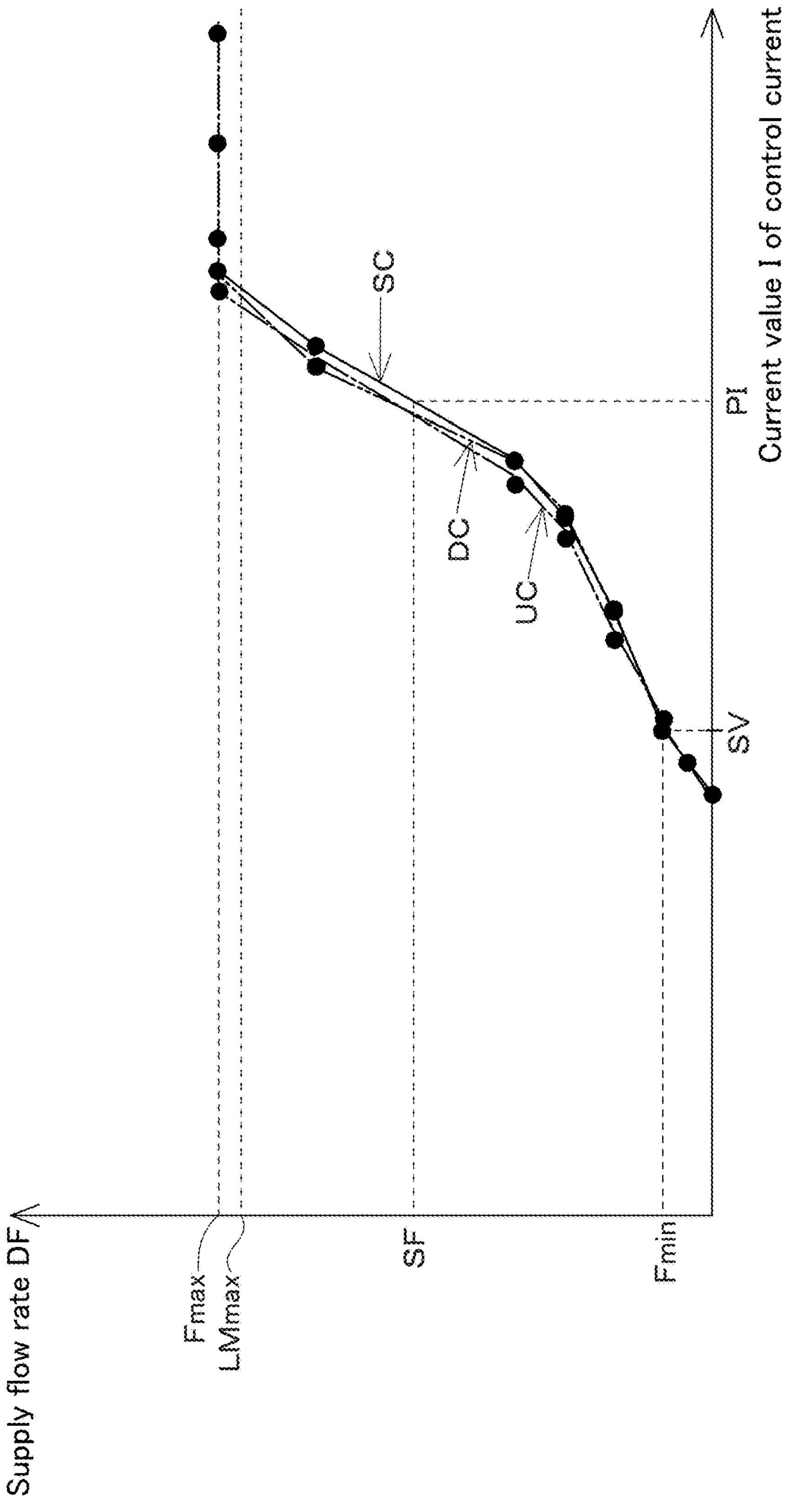
FIG. 17 illustrates an example in which deviations of the maximum flow rate characteristic graph and the minimum flow rate characteristic graph are corrected.

In the present example embodiment, the controller 11 performs, as a process to correct the current value I, calibration of variations in the flow rate of fluid supplied to the lift cylinder 26 resulting from a control valve 30 deviating from the second graph M2 (standard flow rate characteristic graph SC). FIG. 16 illustrates examples of the standard flow rate characteristic graph SC, maximum flow rate characteristic graph UC, and minimum flow rate characteristic graph DC (flow rate characteristics of a minimum-flow-rate control valve 30). FIG. 17 illustrates an example in which deviations of the maximum flow rate characteristic graph UC and the minimum flow rate characteristic graph DC are corrected. In FIGS. 16 and 17, the standard flow rate characteristic graph SC is represented by a solid line, the maximum flow rate characteristic graph UC is represented by a dot-dash line, and the minimum flow rate characteristic graph DC is represented by a dot-dot-dash line.

The controller 11 calculates a deviation value of the flow rate characteristic graph of the maximum-flow-rate control valve 30, corrects the current value I outputted to the control valve 30 using the deviation value, and outputs control current having the corrected current value I to the control valve 30. That is, the controller 11 does not directly correct the maximum-flow-rate control valve 30 or the minimum-flow-rate control valve 30 that provides the flow rate characteristic graph UC or DC deviating from the standard flow rate characteristic graph SC illustrated in FIG. 16. Instead, the controller 11 adds, to the current value I acquired based on the second graph M2 or to the second graph M2, a deviation value ΔF from the standard flow rate characteristic graph SC. This enables the use of the control valve 30 with characteristics close to the standard flow rate characteristics SC as illustrated in FIG. 17. A configuration to achieve such calibration will be described in detail below.

As illustrated in FIG. 12, the working machine 1 includes a calibration mode switch 70 to be operated by the operator to enter a calibration mode. The calibration mode switch 70, when operated by the operator, outputs an instruction to enter the calibration mode to the controller 11. The controller 11, upon receipt of the instruction to set the calibration mode, enters the calibration mode in which the calibration is performed. The calibration mode differs from a normal mode in which normal work or the like is performed.

When in the calibration mode, the controller 11 calculates a deviation value ΔF of the flow rate characteristic graph of the control valve 30 from the standard flow rate characteristic graph SC. For example, when in the calibration mode, the controller 11 corrects the control current to the control valve 30 using the deviation value ΔF and outputs the control current having the corrected current value I to the control valve 30.

For example, the controller 11 calculates, as a deviation value ΔF, a current value I that corresponds to the difference between (i) the supply flow rate DF of the control valve 30 in the case where control current having a predetermined calibration current value PI is outputted to the control valve 30 and (ii) the supply flow rate DF corresponding to the calibration current value PI on the standard flow rate characteristic graph SC, and outputs, to the control valve 30, the control current having the corrected current value I having been corrected by adding the deviation value ΔF to the control current supplied to the control valve 30.

The controller 11 can perform the calibration also with respect to a minimum-flow-rate control valve 30 that is lower in flow rate than the standard flow rate characteristic graph SC. The minimum-flow-rate control valve 30 is smaller in supply flow rate DF than the standard control valve.

Specifically, in the case where control current having the predetermined calibration current value PI is outputted to the control valve 30 for a predetermined time, the controller 11 calculates a flow rate value FV of the hydraulic fluid supplied to the lift cylinder 26 using the amount by which the lift arm 21 is driven (displacement angle XF) detected by the detector 15 and the capacity XQ for hydraulic fluid of the lift cylinder 26. For example, the controller 11 multiplies the displacement angle XF of the lift arm 21 by the unit capacity AQ of the lift cylinder 26 per unit angle to obtain the flow rate value FV of the hydraulic fluid supplied to the lift cylinder 26. The storing unit 11*a* stores the unit capacity AQ in advance. That is, by performing this with respect to the control valve 30 for the first lift cylinder 26L and the control valve 30 for the second lift cylinder 26R, it is possible to calculate the flow rate value FV of the hydraulic fluid of the first lift cylinder 26L and the flow rate value FV of the hydraulic fluid of the second lift cylinder 26R.

The controller 11 may use an expression (1) described below to calculate the flow rate value FV using the total capacity QM for hydraulic fluid of the lift cylinder 26, the maximum displacement angle XM of the lift arm 21, and the displacement angle XF of the lift arm 21. In such a case, the storing unit 11*a* stores the total capacity QM for hydraulic fluid of the lift cylinder 26 in advance.

$$FV = QM \times XF/XM \tag{1}$$

In the case where a value obtained by subtracting the standard flow rate value SF corresponding to the calibration current value PI of the standard flow rate characteristic graph SC from the flow rate value FV (that is, the difference between the flow rate value FV and the standard flow rate value SF) is negative, the controller 11 uses, as the deviation value ΔF (ΔF1), the absolute value of the difference between the current value I corresponding to the flow rate value FV (FV1) on the standard flow rate characteristic graph SC and the calibration current value PI, uses, as the corrected current value I, the current value I obtained by adding the deviation value ΔF1 to the current value I of the control current to the control valve 30, and outputs the control current having the corrected current value I to the control valve 30.

The controller 11 can perform the calibration also with respect to a maximum-flow-rate control valve 30 that is higher in flow rate than the standard flow rate characteristic graph SC.

Specifically, in the case where control current having the calibration current value PI is outputted to the control valve 30, the controller 11 calculates the flow rate value FV (FV2) of the hydraulic fluid supplied to the lift cylinder 26 using the amount by which the lift arm 21 is driven (displacement angle) detected by the detector 15 and the capacity for hydraulic fluid of the lift cylinder 26. The calculation of the flow rate value FV2 is the same as in the case of the minimum-flow-rate control valve 30 described above. In the case where a value obtained by subtracting the standard flow rate value SF corresponding to the calibration current value PI of the standard flow rate characteristic graph SC from the flow rate value FV2 (that is, the difference between the flow rate value FV and the standard flow rate value SF) is positive, the controller 11 uses, as a deviation value ΔF (ΔF2), the absolute value of the difference between the current value I corresponding to the flow rate value FV of the standard flow rate characteristic graph SC and the calibration current value PI, uses, as the corrected current value I, the current value I obtained by subtracting the deviation value ΔF2 from the current value I of the control current to the control valve 30, and outputs the control current having the corrected current value I to the control valve 30.

In the case where the current value I of the control current to the control valve 30 is equal to or more than a specified value SV indicating the current value I corresponding to the minimum flow rate value Fmin in a compensation range in which variations in the supply flow rate of the control valve 30 are compensated for, the controller 11 uses, as the corrected current value I, the current value I obtained by adding the deviation value ΔF to the current value I of the control current to the control valve 30. In the case where the current value I of the control current to the control valve 30 is less than the specified value SV, the corrected current value I is not calculated.

The controller 11 sets, as the calibration current value PI, the current value I corresponding to a flow rate in the central range in the middle of the range from (i) the maximum flow rate value LMmax (such as the maximum flow rate value LMmax of the lift cylinder 26) of the lifter 8 less than the maximum supply flow rate Fmax of the control valve 30 to (ii) the minimum flow rate value Fmin at which variations in the supply flow rate of the at least one control valve 30 are compensated for.

Example embodiments of the present invention provide working machines and methods of controlling working machines described in the following items.

(Item 1) A working machine 1 including a driver 8 including a hydraulic actuator 26 to be actuated by a hydraulic fluid, and a controller 11 configured or programmed to change a drive speed of the driver 8 in a drive start period, wherein the controller 11 is configured or programmed to, if a limit value V based on which operation of the driver 8 is limited is equal to or more than a threshold, perform a first control in which the controller 11 changes the drive speed of the driver 8 in the drive start period based on the limit value V, and if the limit value V is less than the threshold, perform a second control in addition to the first control, the second control being a control in which the controller 11 changes a maximum flow rate MF of the hydraulic fluid to actuate the hydraulic actuator 26 based on the limit value V.

With the working machine 1 according to item 1, it is possible to change the drive speed of the driver 8 in the drive start period based on the limit value V in the case where the limit value V is equal to or more than the threshold, and to further reduce the drive speed of the driver 8 by performing the second control which differs from the first control in addition to the first control in the case where the limit value V is less than the threshold. Thus, the working machine 1 is capable of appropriately adjusting the balance between reducing the occurrence of a shock in the drive start period and work efficiency achieved by the driver 8 depending on the magnitude of the limit value V.

(Item 2) The working machine 1 according to item 1, wherein the controller 11 is configured or programmed to, in the first control, at least when the limit value V is equal to or more than the threshold, change the drive speed of the driver 8 in the drive start period based on the limit value V, and when the limit value V is less than the threshold, perform the first control in the same manner as in a case where the limit value V is equal to the threshold.

With the working machine 1 according to item 2, it is possible to sufficiently change the drive speed of the driver 8 by the first control when the limit value V is equal to or more than the threshold and further reduce the drive speed of the driver 8 by the second control in the case where the limit value V is less than the threshold.

(Item 3) The working machine 1 according to item 1 or 2, wherein the controller 11 is configured or programmed to, in the first control, increase the drive speed of the driver 8 in the drive start period as the limit value V increases, and reduce the drive speed of the driver 8 in the drive start period as the limit value V decreases.

With the working machine 1 according to item 3, it is possible to eliminate or reduce the likelihood that the drive speed with respect to the magnitude of the limit value V feels awkward.

(Item 4) The working machine 1 according to any one of items 1 to 3, further including a first manual operator 42 to operate the driver 8, and a control valve 30 to control the hydraulic actuator 26, wherein the driver 8 includes a driven structure 21 to be driven by the hydraulic actuator 26, the first manual operator 42 is operable to control a target value of a position of the driven structure 21, and the controller 11 is configured or programmed to control the control valve 30 based on a first graph M1 and a second graph M2, the first graph M1 representing a relationship between a target flow rate TF of the hydraulic fluid to actuate the hydraulic actuator 26 and a deviation ΔD of an actual position of the driven structure 21 from the target value, the second graph M2 representing a relationship between a current value I of control current outputted to a predetermined control valve 30 and a flow rate DF of the hydraulic fluid from the predetermined control valve 30.

With the working machine 1 according to item 4, it is possible to change the drive speed of the driver 8 in the drive start period by the first control, and change the target flow rate TF by the second control. This makes it possible to change the responsiveness (sensitivity) of the driver 8 to the operation of the first manual operator 42.

(Item 5) The working machine 1 according to item 4, wherein the controller 11 is configured or programmed to, in the first control, reduce the current value I outputted to the control valve 30 to a greater extent from the current value I acquired based on the second graph M2 as the limit value V decreases toward the threshold.

With the working machine 1 according to item 5, it is possible to appropriately change the drive speed of the driver 8 in the drive start period depending on the magnitude of the limit value V.

(Item 6) The working machine 1 according to item 5, wherein the controller 11 is configured or programmed to, in the first control, correct the second graph M2 or the current value I acquired based on the second graph M2 using a correction value based on the limit value V, and reduce the current value I as the limit value V decreases toward the threshold.

With the working machine 1 according to item 6, it is possible to correct the current value I of the control current using the correction value based on the limit value V and change the drive speed of the driver 8 in the drive start period by a relatively easy process.

(Item 7) The working machine 1 according to item 6, wherein the second graph M2 is defined based on a standard flow rate characteristic graph SC representing a relationship between the current value I outputted to a standard control valve and the flow rate DF of the hydraulic fluid from the standard control valve, the standard control valve being the predetermined control valve 30, and the correction value, in a case where the limit value V is equal to or less than the threshold, is defined using (i) the current value I at a predetermined hydraulic fluid flow rate BF on a flow rate characteristic graph of a maximum-flow-rate control valve 30 that is higher in the flow rate DF of the hydraulic fluid than the standard flow rate characteristic graph SC, and (ii) the current value I at the predetermined hydraulic fluid flow rate BF on the standard flow rate characteristic graph SC.

With the working machine 1 according to item 7, it is possible to cause the second graph M2 to substantially approach the flow rate characteristic graph of the maximum-flow-rate control valve 30 as the limit value V decreases. Therefore, while the drive speed of the driver 8 in the drive start period is changed, the limit value V is changed, making it possible to reduce the difference between the maximum-flow-rate control valve 30 and the standard control valve.

(Item 8) The working machine 1 according to item 4, wherein the controller 11 is configured or programmed to, in the first control, count an elapsed time t elapsed from when the first manual operator 42 is operated and the driver 8 starts being driven, and limit the target flow rate TF to a greater extent as the elapsed time t decreases.

With the working machine 1 according to item 8, it is possible to appropriately change the drive speed of the driver 8 in the drive start period based on the elapsed time t from when the driver 8 starts being driven.

(Item 9) The working machine 1 according to item 8, wherein the controller 11 is configured or programmed to, in the first control, limit the target flow rate TF based on a third graph M3 that represents a relationship between the elapsed time t and the target flow rate TF.

With the working machine 1 according to item 9, it is possible to appropriately change the drive speed of the driver 8 in the drive start period using the predetermined third graph M3 by a relatively easy process.

(Item 10) The working machine 1 according to item 9, wherein the controller 11 is configured or programmed to, in the first control, acquire the third graph M3 in which the target flow rate TF against the elapsed time t is smaller as the limit value V decreases toward the threshold.

With the working machine 1 according to item 10, it is possible to appropriately change the drive speed of the driver 8 in the drive start period based on the magnitude of the limit value V.

(Item 11) The working machine 1 according to item 9 or 10, wherein the driver 8 is a lifter to raise and lower a working device 3, and the controller 11 is configured or programmed to, in the first control, acquire the third graph M3 that differs depending on the content of work performed by the working device 3.

With the working machine 1 according to item 11, it is possible to appropriately change the drive speed of the driver 8 in the drive start period based on the content of work.

(Item 12) The working machine 1 according to item 9 or 10, further including a machine body 2, and a protection structure 6 to protect an operator's seat 7 on the machine body 2, wherein the first manual operator 42 includes an inner manual operator 42*a* provided inside the protection structure 6 and an outer manual operator 42*b* provided outside the protection structure 6, and the controller 11 is configured or programmed to, in the first control, when the inner manual operator 42*a* is operated, acquire the third graph M3 that differs from when the outer manual operator 42*b* is operated.

With the working machine 1 according to item 12, it is possible to appropriately change the drive speed of the driver 8 in the drive start period in the case where the operator operates the inner manual operator 42*a* and in the case where the operator operates the outer manual operator 42*b*.

(Item 13) The working machine 1 according to item 9 or 10, wherein the controller 11 is configured or programmed to calculate a deviation value of a flow rate characteristic graph of a maximum-flow-rate control valve from a standard flow rate characteristic graph SC representing a relationship between the current value I outputted to a standard control valve and the flow rate DF of the hydraulic fluid, the standard control valve being the predetermined control valve 30, the flow rate characteristic graph of the maximum-flow-rate control valve being higher in the flow rate of the hydraulic fluid than the standard flow rate characteristic graph SC, correct the current value I outputted to the control valve 30 using the deviation value, and output the control current having the corrected current value I to the control valve 30.

With the working machine 1 according to item 13, it is possible to perform calibration of variations in the flow rate of fluid supplied to the hydraulic actuator 26 resulting from the control valve 30 deviating from the standard flow rate characteristic graph SC. Therefore, it is possible to make effective use of a control valve 30 deviating from the standard flow rate characteristic graph SC. It is also possible to cause the operation of the driver 8, achieved when using the control valve 30 deviating from the flow rate characteristic graph, to approach the operation of another driver 8 that includes a control valve 30 matching the standard flow rate characteristic graph SC, making it possible to, even when using a control valve 30 deviating from the flow rate characteristic graph, to reduce variations in operation of the driver 8. Thus, it is possible to reduce the difference in performance between control valves 30, and possible to provide working machines 1 with stable quality.

(Item 14) The working machine 1 according to any one of items 1 to 13, further including a second manual operator 46 to control the limit value V, wherein values of the limit value V are allocated to respective operation amounts of the second manual operator 46.

With the working machine 1 according to item 14, the operator is able to control the limit value V intuitively and quickly by rotating the second manual operator 46 in the form of a dial.

(Item 15) The working machine 1 according to any one of items 1 to 14, wherein the driver 8 is a lifter to raise and lower a working device 3, the lifter including a driven structure 21 to be driven by driving the hydraulic actuator 26, the hydraulic actuator 26 includes a lift cylinder, and the driven structure 21 includes a lift arm to be driven by driving the lift cylinder 26.

With the working machine 1 according to item 15, it is possible to achieve the foregoing unique effect(s), and appropriately adjust the balance between reducing the occurrence of a shock in the drive start period and work efficiency achieved by the working device 3 being raised or lowered, when the working device 3 is raised or lowered.

(Item 16) The working machine 1 according to item 15 in combination with item 4, wherein the controller 11 is configured or programmed to, when causing the lift arm 21 to be raised in response to operation of the first manual operator 42, perform the first control or perform the first control and the second control, and, when causing the lift arm 21 to be lowered in response to operation of the first manual operator 42, not perform the first control or the second control.

With the working machine 1 according to item 16, it is possible to achieve the foregoing unique effect(s) in the case where the working device 3 is raised.

(Item 17) The working machine 1 according to item 14, according to item 15 in combination with item 14, or according to item 16 in combination with item 15, wherein the controller 11 is configured or programmed to, in the second control, increase the maximum flow rate MF as the limit value V increases, and reduce the maximum flow rate MF as the limit value V decreases.

With the working machine 1 according to item 17, the operator need only increase the limit value V in the case where the operator wishes to increase the drive speed of the driver 8 in the drive start period, and reduce the limit value V in the case where the operator wishes to reduce the drive speed. Therefore, the operator is able to control the limit value V without an awkward feeling.

(Item 18) A method of controlling a working machine 1 which includes a driver 8 including a hydraulic actuator 26 to be actuated by a hydraulic fluid, and a controller 11 configured or programmed to change a drive speed of the driver 8 in a drive start period, the method including causing the controller 11 to, if a limit value V based on which operation of the driver 8 is limited is equal to or more than a threshold, perform a first control in which the controller 11 changes the drive speed of the driver 8 in the drive start period based on the limit value V (first step), and causing the controller 11 to, if the limit value V is less than the threshold, perform a second control in addition to the first control, the second control being a control in which the controller 11 changes a maximum flow rate MF of the hydraulic fluid to actuate the hydraulic actuator 26 based on the limit value V (second step).

With the method of controlling a working machine 1 according to item 18, it is possible to change the drive speed of the driver 8 in the drive start period based on the limit value V in the case where the limit value V is equal to or more than the threshold, and to further reduce the drive speed of the driver 8 by performing the second control which differs from the first control in addition to the first control in the case where the limit value V is less than the threshold. Thus, the working machine 1 is capable of appropriately adjusting the balance between reducing the occurrence of a shock in the drive start period and work efficiency achieved by the driver 8 depending on the magnitude of the limit value V.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a driver including a hydraulic actuator to be actuated by a hydraulic fluid;

a control valve to control the hydraulic actuator;

an operable input device; and a controller configured or programmed to:

acquire a target flow rate of the hydraulic fluid supplied to the hydraulic actuator;

control an opening of the control valve based on the target flow rate;

control a flow rate of the hydraulic fluid supplied to the hydraulic actuator from the control valve to be equal to or less than a predetermined maximum flow rate;

when a limit value defined by operating the input device is less than a threshold, perform a first control in which the controller changes a drive speed of the driver in a drive start period based on the limit value by changing the opening of the control valve corresponding to the target flow rate, and perform a second control in which the controller changes the maximum flow rate of the hydraulic fluid to actuate the hydraulic actuator based on the limit value; and when the limit value is equal to or more than the threshold, perform the first control and not perform the second control.

2. The working machine according to claim 1, wherein the controller is configured or programmed to, in the first control;

increase the drive speed of the driver in the drive start period as the limit value increases; and reduce the drive speed of the driver in the drive start period as the limit value decreases.

3. A method of controlling a working machine which includes a driver including a hydraulic actuator to be actuated by a hydraulic fluid, a control valve to control the hydraulic actuator, an operable input device, and a controller configured or programmed to acquire a target flow rate of the hydraulic fluid supplied to the hydraulic actuator, control an opening of the control valve based on the target flow rate, and control a flow rate of the hydraulic fluid supplied to the hydraulic actuator from the control valve to be equal to or less than a predetermined maximum flow rate, the method comprising:

causing the controller to, when a limit value defined by operating the input device is less than a threshold, perform a first control in which the controller changes a drive speed of the driver in a drive start period based on the limit value by changing the opening of the control valve corresponding to the target flow rate; and causing the controller to, when the limit value is less than the threshold, perform a second control in addition to the first control, the second control being a control in which the controller changes the maximum flow rate of the hydraulic fluid to actuate the hydraulic actuator based on the limit value; wherein when the limit value is equal to or more than the threshold, the controller performs the first control and does not perform the second control.

* * * * *